United States Patent
Jutori et al.

(10) Patent No.: US 11,381,510 B2
(45) Date of Patent: Jul. 5, 2022

(54) COMMUNICATION APPARATUS, SYSTEM CONTROL APPARATUS, TRAIN COMMUNICATION SYSTEM, AND COMMUNICATION METHOD FOR CONTROLLING TRANSMISSION OF LOW LATENCY FRAMES AND GENERAL FRAMES

(71) Applicant: Mitsubishi Electric Corporation, Tokyo (JP)

(72) Inventors: Motonobu Jutori, Tokyo (JP); Sachiko Taniguchi, Tokyo (JP); Shingo Honda, Tokyo (JP); Yuji Goto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 728 days.

(21) Appl. No.: 16/322,852

(22) PCT Filed: Aug. 8, 2016

(86) PCT No.: PCT/JP2016/073315
§ 371 (c)(1),
(2) Date: Feb. 1, 2019

(87) PCT Pub. No.: WO2018/029756
PCT Pub. Date: Feb. 15, 2018

(65) Prior Publication Data
US 2021/0336888 A1 Oct. 28, 2021

(51) Int. Cl.
*H04L 47/2425* (2022.01)
*B61L 15/00* (2006.01)
(Continued)

(52) U.S. Cl.
CPC ...... *H04L 47/2433* (2013.01); *B61L 15/0036* (2013.01); *B61L 15/0072* (2013.01);
(Continued)

(58) Field of Classification Search
CPC .......... H04L 47/2433; H04L 12/40163; H04L 67/12; H04L 2012/40293; H04L 45/304;
(Continued)

(56) References Cited

U.S. PATENT DOCUMENTS 8,671,176 B1 * 3/2014 Kharitonov ............. H04L 45/02
709/223
10,528,498 B2 * 1/2020 Inoue ..................... H04L 43/08
(Continued)

FOREIGN PATENT DOCUMENTS

CN 1700632 A 11/2005
EP 0582537 A2 * 2/1994 ......... H04L 47/2433
(Continued)

OTHER PUBLICATIONS

Japanese Office Action dated Jun. 4, 2019 issued in corresponding Japan patent application No. 2018-533319, 5 pages including 3 pages of English translation.
(Continued)

*Primary Examiner* — Mounir Moutaouakil
(74) *Attorney, Agent, or Firm* — Buchanan Ingersoll & Rooney PC

(57) ABSTRACT

A communication apparatus is mounted on a train and forms a train communication system together with a system control apparatus that generates control frames including general and low-latency frames. The communication apparatus includes: a general transfer processing unit that stores the general frame; a low latency transfer processing unit that stores the low-latency frame, the low latency frame requiring transferring with lower latency than the general frame; a frame identification unit that identifies priority of the control frame and outputs the control frame to the general transfer processing unit or the low latency transfer processing unit based on a priority setting table indicating the
(Continued)

priority of the control frame and set in the identification unit; an output control unit that preferentially transfers the low-latency frame over the general frame; and a control unit that modifies the priority setting table.

20 Claims, 15 Drawing Sheets

(51) Int. Cl.
  *H04L 12/40* (2006.01)
  *H04L 67/12* (2022.01)
(52) U.S. Cl.
  CPC ........ *H04L 12/40163* (2013.01); *H04L 67/12* (2013.01); *H04L 2012/40293* (2013.01)
(58) Field of Classification Search
  CPC . H04L 49/206; B61L 15/0036; B61L 15/0072
  See application file for complete search history.

(56) References Cited

U.S. PATENT DOCUMENTS

| | | | |
|---|---|---|---|
| 2005/0175013 A1* | 8/2005 | Le Pennec | H04L 47/10 370/395.42 |
| 2009/0122807 A1* | 5/2009 | Yoshizawa | H04L 12/40163 370/442 |
| 2014/0177471 A1* | 6/2014 | Kharitonov | H04L 41/084 370/254 |
| 2014/0369196 A1 | 12/2014 | Yamagishi | |
| 2017/0041243 A1* | 2/2017 | Nakayasu | H04L 47/56 |

FOREIGN PATENT DOCUMENTS

| | | | |
|---|---|---|---|
| JP | 2005333724 A | 12/2005 |
| JP | 2006332849 A | 12/2006 |
| JP | 2015002481 A | 1/2015 |
| WO | 2009/064027 A1 | 5/2009 |
| WO | 2015/163094 A1 | 10/2015 |

OTHER PUBLICATIONS

International Search Report (with English translation) and Written Opinion issued in corresponding International Patent Application No. PCT/JP2016/073315, 9 pages (dated Oct. 18, 2016).

Office Action dated Nov. 11, 2020, by the India Patent Office in corresponding India Patent Application No. 201947002037 including an English translation of the Office Action. (6 pages).

Office Action dated Dec. 1, 2021, issued in the corresponding Chinese Patent Application No. 201680088262.5, 11 pages including 4 pages of Partial English Translation.

* cited by examiner

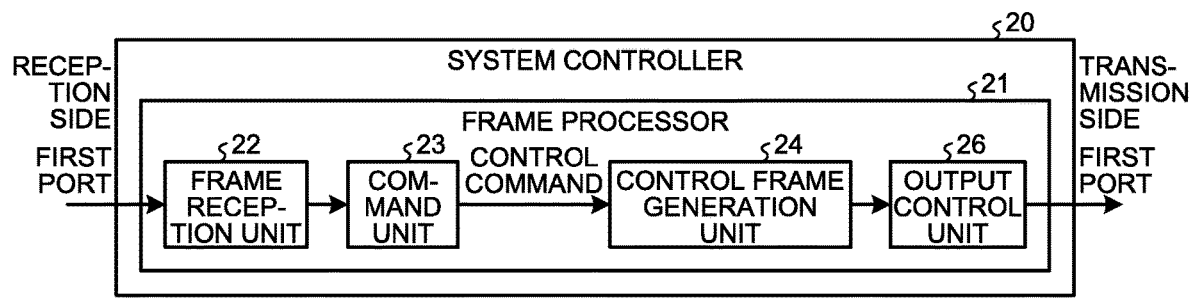

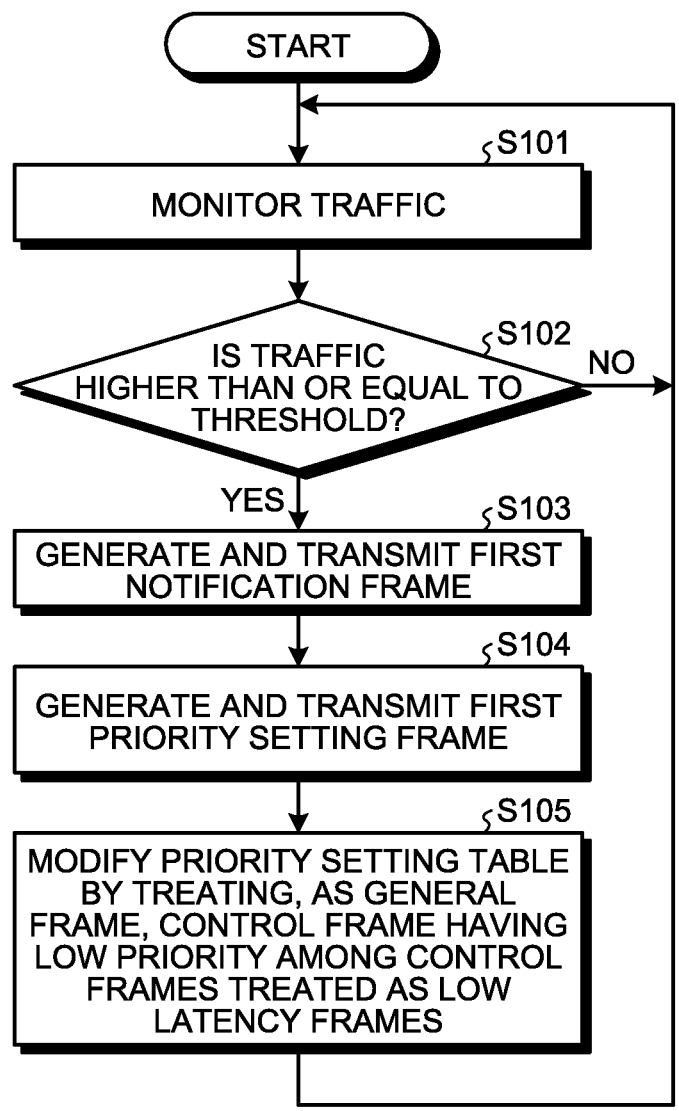

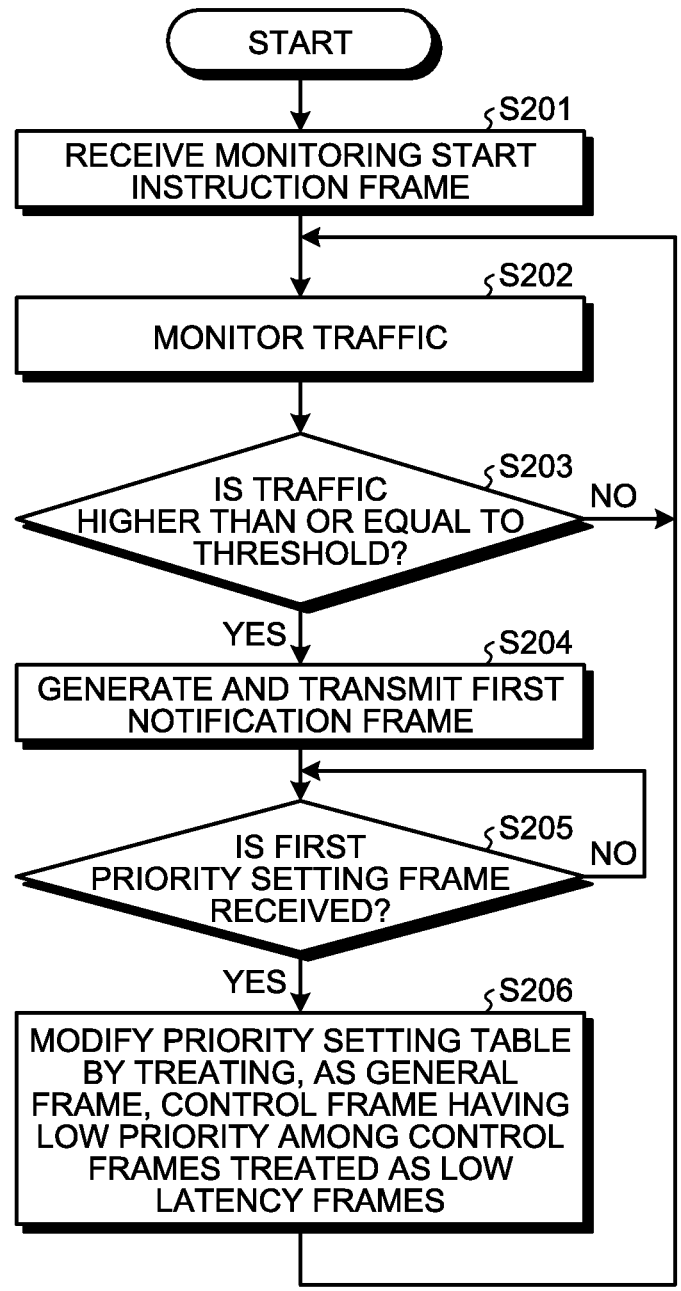

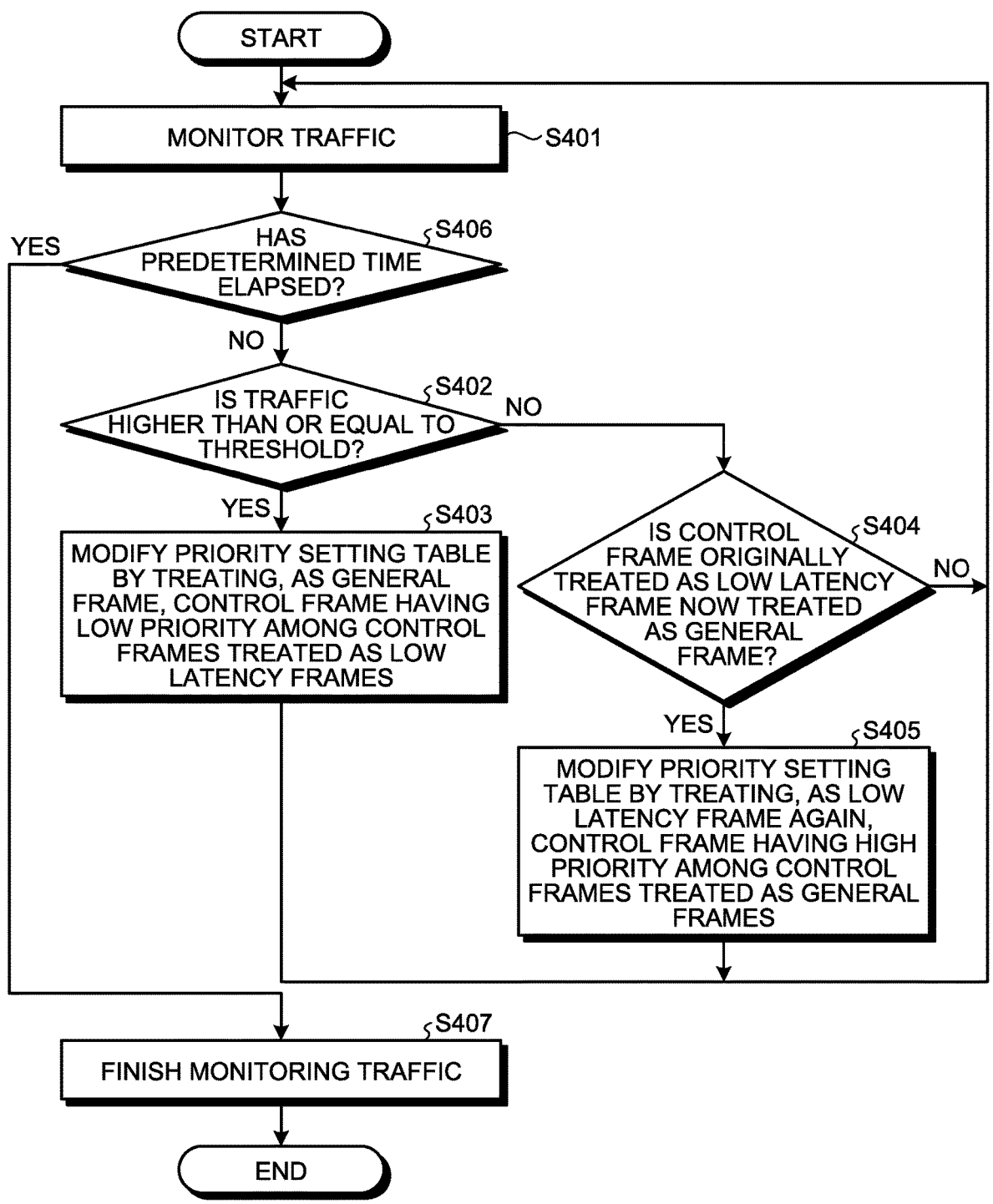

COMMUNICATION APPARATUS, SYSTEM CONTROL APPARATUS, TRAIN COMMUNICATION SYSTEM, AND COMMUNICATION METHOD FOR CONTROLLING TRANSMISSION OF LOW LATENCY FRAMES AND GENERAL FRAMES

FIELD

The present invention relates to a communication apparatus for performing communication on a train, a system control apparatus, a train communication system, and a communication method.

BACKGROUND

Known train cars, which communicate with one another, have their communication apparatuses to transmit and receive various pieces of control information therebetween. In recent years, it is considered that these pieces of control information are transmitted and received by an Ethernet (registered trademark) frame. A communication apparatus, which uses the Ethernet frame for communication, includes a plurality of queues such as a queue for a general frame and a queue for a low latency frame required to be transferred with lower latency than the general frame. The communication apparatus can transfer the low latency frame with low latency because the communication apparatus preferentially transmits a low latency frame stored in such a low-latency-frame queue.

When a low latency frame cannot be stored in the low-latency-frame queue due to heavy traffic thereof, the communication apparatus needs to discard the low latency frame that cannot be stored in the low-latency-frame queue. To address such a problem, Patent Literature 1 discloses a communication apparatus includes a queue for an Ethernet frame on a service-class-by-service-class basis. For the communication apparatus disclosed in Patent Literature 1, an Ethernet frame, which cannot be transferred using a relevant service class, is transferred from another service class having a vacant bandwidth, with the result that the discarding of Ethernet frames can be reduced.

CITATION LIST

Patent Literature

Patent Literature 1: Japanese Patent Application Laid-open No. 2015-2481

SUMMARY

Technical Problem

For the above conventional technique, unfortunately, some Ethernet frames within the same class of service have different degrees of requirement for low latency. When an Ethernet frame that cannot be transferred using a primary service class is transferred using another service class having a vacant bandwidth, the transfer of the Ethernet frame that truly requires low latency can be delayed because this Ethernet frame is transferred from the service class lower than the primary service class.

The present invention has been made in view of the above, and an object of the present invention is to provide a communication apparatus that can reduce discarding of Ethernet frames while reducing latency of an Ethernet frame that truly requires low latency.

Solution to Problem

In order to solve the above problem and achieve the object, the present invention provides a communication apparatus mounted on a train, the communication apparatus forming a train communication system together with a system control apparatus that generates control frames. The communication apparatus comprises a general transfer processing unit to store a general frame among the control frames, and a low latency transfer processing unit to store a low latency frame among the control frames, the low latency frame being required to be transferred with lower latency than the general frame. The communication apparatus further comprises: a frame identification unit to identify priority of each of the control frames received from the system control apparatus and perform control that outputs the control frame to the general transfer processing unit or the low latency transfer processing unit on the basis of a priority setting table that indicates the priority of the control frame, the priority setting table being set in the frame identification unit; an output control unit to preferentially transfer the low latency frame stored in the low latency transfer processing unit over the general frame stored in the general transfer processing unit; and a control unit to perform control that modifies the priority setting table of the frame identification unit.

Advantageous Effects of Invention

The present invention can reduce discarding of Ethernet frames while reducing latency of an Ethernet frame that truly requires low latency.

BRIEF DESCRIPTION OF DRAWINGS

FIG. 4 is a block diagram illustrating an example of the configuration of a system control apparatus that transmits and receives a general frame according to the first embodiment.

FIG. 5 is a table illustrating an example of a priority setting table of control frames set in a frame identification unit of the communication apparatus according to the first embodiment.

FIG. 6 is a flowchart illustrating processing in which a control frame having low priority among control frames treated as low latency frames is treated as a general frame and transferred in the train communication system according to the first embodiment.

FIG. 7 is a flowchart illustrating processing performed by the communication apparatus when a control frame having low priority among control frames treated as low latency frames is treated as a general frame and transferred in the train communication system according to the first embodiment.

FIG. 19 is a flowchart illustrating transfer processing in which monitoring of traffic of low latency frames is finished after a predetermined time elapses from start of the monitoring in the train communication system according to a sixth embodiment.

DESCRIPTION OF EMBODIMENTS

A communication apparatus, a system control apparatus, a train communication system, and a communication method according to embodiments of the present invention will now be described in detail with reference to the drawings. Note that the present invention is not limited to the embodiments.

First Embodiment

Figure 1:
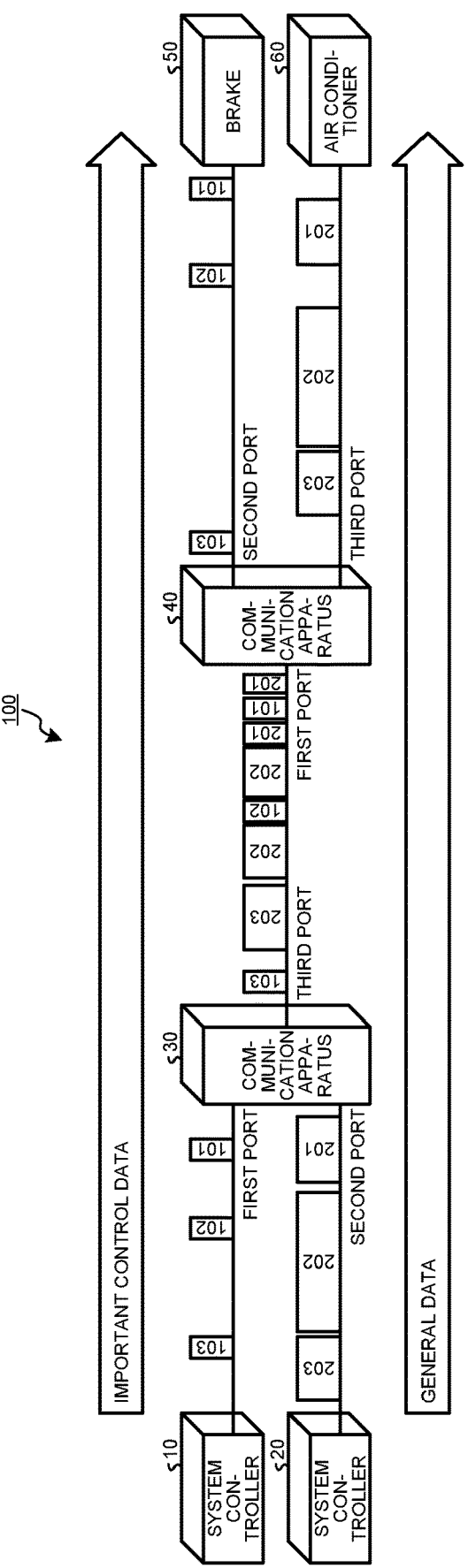
FIG. 1 is a diagram illustrating an example of the configuration of a train communication system according to a first embodiment.

FIG. 1 is a diagram illustrating an example of the configuration of a train communication system 100 according to a first embodiment of the present invention. The train communication system 100 includes system control apparatuses 10 and 20, communication apparatuses 30 and 40, a brake 50, and an air conditioner 60. The apparatuses of the train communication system 100 are mounted on a train. The communication apparatuses 30 and 40 are mounted on each car of the train. The train communication system 100 transmits and receives a control frame using an Ethernet frame.

The system control apparatus 10 generates and transmits a low latency frame. The low latency frame, which is a control frame for controlling the brake 50, is important control data required to be transferred with lower latency than a general frame. The system control apparatus 10 also controls control frame transfer processing performed by the communication apparatuses 30 and 40.

The system control apparatus 20 generates and transmits a general frame which is a control frame for controlling the air conditioner 60. The general frame is a frame of general data not required to be transferred with low latency as much as the low latency frame is.

The communication apparatus 30 is a hub that controls output of control frames received from the system control apparatuses 10 and 20, and transfers the control frames to the communication apparatus 40. The communication apparatus 30 also performs control to sort and output control frames received from the communication apparatus 40, to the system control apparatus 10 or 20. The communication apparatus 30 preferentially transfers the low latency frame over the general frame.

The communication apparatus 40 is a hub that performs control to sort and output control frames received from the communication apparatus 30, to the brake 50 or the air conditioner 60. The communication apparatus 40 also controls output of control frames received from the brake 50 and the air conditioner 60 and transfers the control frames to the communication apparatus 30. The communication apparatus 40 preferentially transfers the low latency frame over the general frame.

The brake 50 is a controlled device that receives the low latency frame which is the control frame from the system control apparatus 10 via the communication apparatuses 30 and 40, and decelerates the train on the basis of the content of the received low latency frame. The brake 50 also transmits a control frame indicating the content of operation performed to the system control apparatus 10 via the communication apparatuses 40 and 30.

The air conditioner 60 is a controlled device that receives the general frame which is the control frame from the system control apparatus 20 via the communication apparatuses 30 and 40, and performs air conditioning of the train on the basis of the content of the received general frame. The air conditioner 60 also transmits a control frame indicating the content of operation performed to the system control apparatus 20 via the communication apparatuses 40 and 30.

Note that the train communication system 100 of FIG. 1 includes the two system control apparatuses and the two controlled devices, but may include the one or more than two system control apparatuses and the one or more than two controlled devices. The controlled device includes a display device that displays content such as information on operation of the train or an advertisement in a car, for example. When equipped with the display device, the train communication system 100 further includes another system control apparatus that generates and transmits a control frame for controlling the display device.

Moreover, in a case where the number of cars of the train equipped with the train communication system 100 is changed by splitting of the train set or combination of the train sets, the train communication system 100 can flexibly accommodate such a change as the train communication system 100 includes the communication apparatuses corresponding in number to the number of cars. The train communication system 100 including the two communication apparatuses as illustrated in FIG. 1 will be described by way of example.

Next, the configuration of each apparatus will be described.

Figure 2:
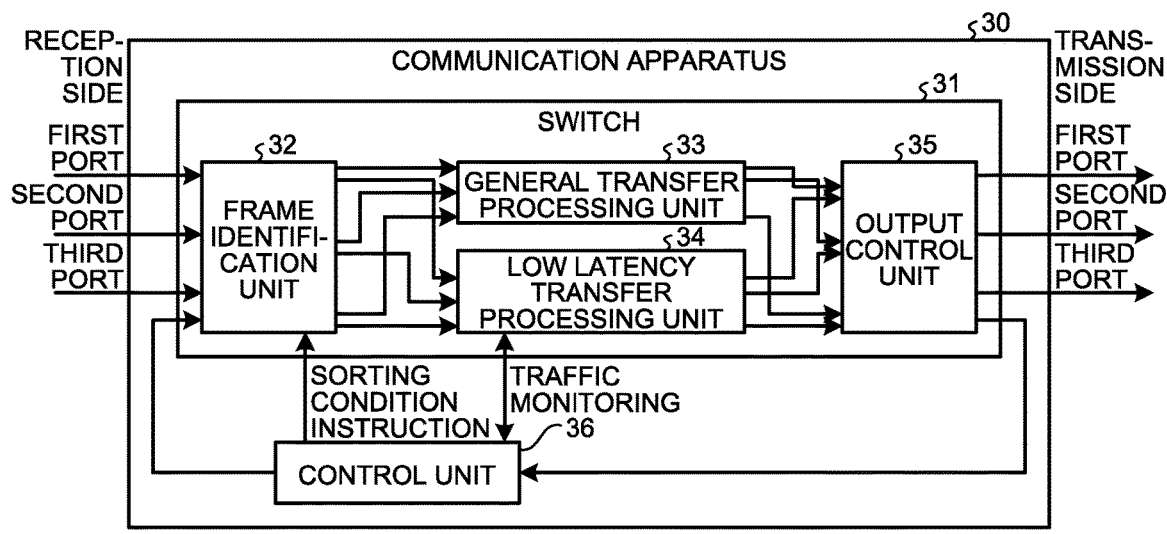
FIG. 2 is a block diagram illustrating an example of the configuration of a communication apparatus according to the first embodiment.

FIG. 2 is a block diagram illustrating an example of the configuration of the communication apparatus 30 according to the first embodiment. The communication apparatus 30 will be described by way of example as the communication apparatuses 30 and 40 have the same configuration. The communication apparatus 30 includes a switch 31 and a control unit 36. The switch 31 includes a frame identification unit 32, a general transfer processing unit 33, a low latency transfer processing unit 34, and an output control unit 35.

Although FIG. 2 illustrates first to third ports on each of a reception side and a transmission side of the communication apparatus 30, the communication apparatus 30 practically includes three ports. Each port can be either a reception port or a transmission port depending on a destination of a control frame. Specifically, the communication apparatus 30 illustrated in FIG. 1 receives, at the first port, low latency frames 101 to 103 from the system control apparatus 10 and receives, at the second port, general frames 201 to 203 from the system control apparatus 20. The communication apparatus 30 transfers the low latency frames and the general frames from the third port to the communication apparatus 40. Conversely, the communication apparatus 30 receives, at the third port, control frames from the brake 50 and the air conditioner 60 via the communication apparatus 40. The communication apparatus 30 transfers the control frames received from the brake 50, from the first port to the system control apparatus 10. The communication apparatus 30 transfers the control frame received from the air conditioner 60, from the second port to the system control apparatus 20. The communication apparatus 30 may include two or fewer, or four or more ports alternatively to the three ports.

Similarly, the communication apparatus 40 illustrated in FIG. 1 receives, at the first port, control frames from the system control apparatuses 10 and 20 via the communication apparatus 30. The communication apparatus 40 transfers the low latency frames 101 to 103 received from the system control apparatus 10, from the second port to the brake 50, and transfers the general frames 201 to 203 received from the system control apparatus 20, from the third port to the air conditioner 60. Conversely, the communication apparatus 40 receives a control frame from the brake 50 at the second port and a control frame from the air conditioner 60 at the third port, and transfers the received frames from the first port to the communication apparatus 30. The communication apparatus 40 may include two or fewer, or four or more ports alternatively to the three ports.

The switch 31 performs control to preferentially transfer a low latency frame from one port when receiving control frames at the other two ports. The switch 31 performs control to sort and transfer control frames to two ports when receiving control frames at the other one port.

The frame identification unit 32 identifies the priority of control frames received from the system control apparatuses 10 and 20 by checking header portions of the received control frames, and performs control to output the control frame to either the general transfer processing unit 33 or the low latency transfer processing unit 34 on the basis of a priority setting table indicating the set priority of the control frame. The priority setting table is set in the frame identification unit 32. The frame identification unit 32 outputs a control frame identified as a low latency frame to the low latency transfer processing unit 34, and outputs a control frame identified as a general frame to the general transfer processing unit 33.

The general transfer processing unit 33 stores, in a buffer, the general frame output from the frame identification unit 32, and transfers the general frame by a store-and-forward method under output control of the output control unit 35.

The low latency transfer processing unit 34 stores, in a buffer, the low latency frame output from the frame identification unit 32, and transfers the low latency frame by a cut-through method or the like under output control of the output control unit 35.

The output control unit 35 checks a status of storage of the control frame in each of the general transfer processing unit 33 and the low latency transfer processing unit 34, and preferentially transfers the low latency frame stored in the low latency transfer processing unit 34 over the general frame stored in the general transfer processing unit 33. When a low latency frame is stored in the low latency transfer processing unit 34 while a general frame is being transferred from the general transfer processing unit 33, the output control unit 35 suspends the transfer of the general frame and starts transferring the low latency frame. After finishing transfer of the low latency frame, the output control unit 35 resumes transfer of an untransferred portion of the general frame whose transfer has been suspended. In the example of FIG. 1, the output control unit 35 suspends transfer of the general frame 201 to preferentially transfer the low latency frame 101, and transfers an untransferred portion of the general frame 201 whose transfer has been suspended after finishing the transfer of the low latency frame 101. Likewise, the output control unit 35 suspends transfer of the general frame 202 to preferentially transfer the low latency frame 102, and transfers an untransferred portion of the general frame 202 whose transfer has been suspended after finishing the transfer of the low latency frame 102.

The switch 31 performs processing of transferring the control frame under the control of the control unit 36. In the present embodiment, the control unit 36 monitors traffic of low latency frames in the low latency transfer processing unit 34. When the traffic of the low latency frames in the low latency transfer processing unit 34 becomes equal to or higher a predetermined threshold, a plurality of the control frames treated as the low latency frames is controlled by the control unit 36 such that the control frames are treated as generals frames in increasing order of priority. The control unit 36 provides the frame identification unit 32 with a sorting condition instruction to change a destination of a received control frame output from the frame identification unit 32 and modifies the priority setting table of the frame identification unit 32.

Specifically, the control unit 36 monitors the traffic of the low latency frames in the low latency transfer processing unit 34 and, when the traffic of the low latency frames is equal to or higher than a threshold, transmits a first notification frame to the system control apparatus 10, the first notification frame indicating that the traffic of the low latency frames is equal to or higher than the threshold. The control unit 36 transmits the first notification frame to the system control apparatus 10 via the frame identification unit 32, the general transfer processing unit 33 or the low latency transfer processing unit 34, and the output control unit 35. In response to the first notification frame, the control unit 36 receives, from the system control apparatus 10, a first priority setting frame instructing a modification to the priority setting table set in the communication apparatus 30, such that the control frames treated as the low latency frames come to be treated as the general frames in increasing order of the priority. The control unit 36 receives the first priority setting frame from the system control apparatus 10 via the frame identification unit 32, the low latency transfer processing unit 34, and the output control unit 35. On the basis of the first priority setting frame, the control unit 36 modifies the priority setting table of the frame identification unit 32 such that the control frames treated as the low latency frames come to be treated as the general frames in increasing order of the priority. Note that the first embodiment is similar to the other embodiments in the path of the control frame transmitted and received between the control unit 36 and the system control apparatus 10.

The control unit 36 monitors the traffic of the low latency frames in the low latency transfer processing unit 34 by checking a usage rate of the buffer in the low latency transfer processing unit 34 or by counting the number of low latency frames discarded due to an overflow of the buffer in the low latency transfer processing unit 34, for example.

Figure 3:
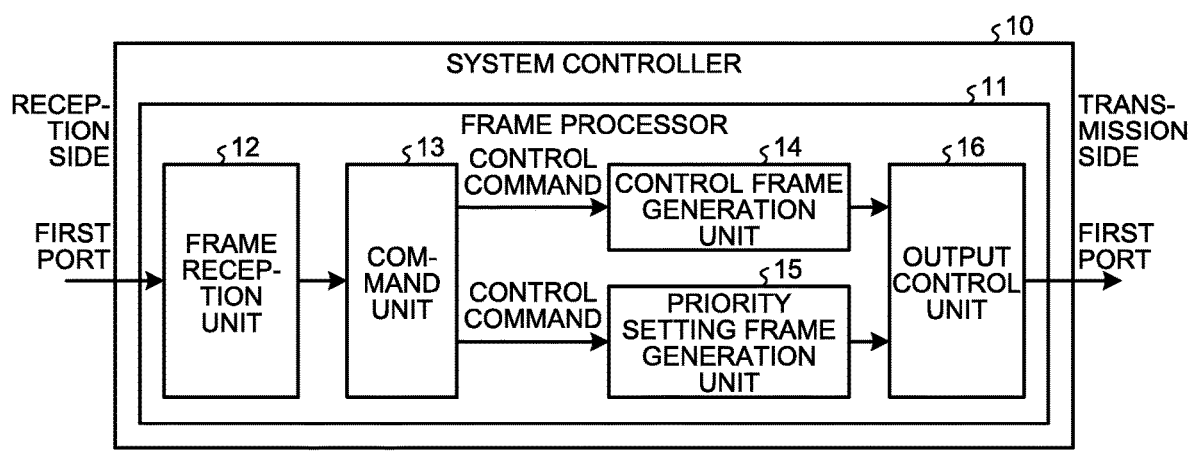
FIG. 3 is a block diagram illustrating an example of the configuration of a system control apparatus that transmits and receives a low latency frame according to the first embodiment.

FIG. 3 is a block diagram illustrating an example of the configuration of the system control apparatus 10 that transmits and receives a low latency frame according to the first embodiment. The system control apparatus 10 includes a frame processor 11. The frame processor 11 includes a frame reception unit 12, a command unit 13, a control frame generation unit 14, a priority setting frame generation unit 15, and an output control unit 16.

Although FIG. 3 illustrates a first port on each of a reception side and a transmission side of the system control apparatus 10, the system control apparatus 10 practically includes one first port. The first port can be either a reception port or a transmission port depending on a destination of a transmitted control frame. Specifically, the system control apparatus 10 illustrated in FIG. 1 generates a low latency frame which is a control frame for controlling the brake 50, and transmits the generated low latency frame from the first port. Meanwhile, the system control apparatus 10 receives, at the first port, a control frame from the brake 50. When receiving, at the first port, the first notification frames from the communication apparatuses 30 and 40, the system control apparatus 10 generates the first priority setting frame and transmits the generated first priority setting frame from the first port to the communication apparatuses 30 and 40. The system control apparatus 10 may include two or more ports alternatively to the one port.

The frame processor 11 performs control to generate a low latency frame and transmit the generated low latency frame to the brake 50 and, when receiving the first notification frames from the communication apparatuses 30 and 40, generate the first priority setting frame and transmit the generated first priority setting frame to the communication apparatuses 30 and 40.

The frame reception unit 12 receives the control frame transmitted from the brake 50 via the communication apparatuses 30 and 40, and receives the first notification frame transmitted from the communication apparatus 30 or 40. The frame reception unit 12 outputs the received control frame and the received first notification frame to the command unit 13.

The command unit 13 receives the control frame from the frame reception unit 12 and notifies the control frame generation unit 14 of device information on the brake 50, the device information being included in the control frame. The command unit 13 also receives the first notification frame from the frame reception unit 12 and instructs the priority setting frame generation unit 15 to generate the first priority setting frame which is a response to the first notification frame. The first priority setting frame is a control frame instructing a modification to the priority setting tables set in the communication apparatuses 30 and 40, the priority setting tables indicating priorities of the control frames. In accordance with the instructions of the first priority setting frame, the priority setting table is modified such that the control frames treated as the low latency frames come to be treated as the general frames in increasing order of the priority. When the first notification frame includes information on the traffic of the low latency frames, the command unit 13 may notify the priority setting frame generation unit 15 of the information on the traffic of the low latency frames. The command unit 13 outputs control commands to thereby give instructions to the control frame generation unit 14 and the priority setting frame generation unit 15.

The control frame generation unit 14 generates a low latency frame for controlling the brake 50. The low latency frame is a control frame that requires transferring with low latency.

The priority setting frame generation unit 15 generates the first priority setting frame on the basis of an instruction from the command unit 13. Of the control frames treated as the low latency frames in the priority setting tables of the communication apparatuses 30 and 40, one control frame having low priority is treated as the general frame in accordance with the instruction of the first priority setting frame from the priority setting frame generation unit 15, for example. Alternatively, when the command unit 13 notifies the priority setting frame generation unit 15 of the information on the traffic of the low latency frames, the priority setting frame generation unit 15 determines more than one low latency frames in the first priority setting frame, which in turn changes the priority setting tables in the communication apparatuses 30 and 40 such that the control frames having the low priority among the control frames treated as the low latency frames are treated as the general frames.

The output control unit 16 performs control to transmit, to the communication apparatus 30, the low latency frame generated by the control frame generation unit 14 and the first priority setting frame generated by the priority setting frame generation unit 15. The output control unit 16 multicasts the first priority setting frame.

FIG. 4 is a block diagram illustrating an example of the configuration of the system control apparatus 20 that transmits and receives a general frame according to the first embodiment. The system control apparatus 20 includes a frame processor 21. The frame processor 21 includes a frame reception unit 22, a command unit 23, a control frame generation unit 24, and an output control unit 26.

Although FIG. 4 illustrates a first port on each of a reception side and a transmission side of the system control apparatus 20, the system control apparatus 20 practically includes one first port. The first port can be either a reception port or a transmission port depending on a destination of a transmitted control frame. Specifically, the system control apparatus 20 illustrated in FIG. 1 generates a general frame which is a control frame for controlling the air conditioner 60 and transmits the generated general frame from the first port. Meantime, the system control apparatus 20 receives, at the first port, a control frame from the air conditioner 60. The system control apparatus 20 may include two or more ports alternatively to the one port.

The frame processor 21 performs control to generate the general frame and transmit the generated general frame to the air conditioner 60.

The frame reception unit 22 receives the control frame transmitted from the air conditioner 60 via the communication apparatuses 30 and 40. The frame reception unit 22 outputs the received control frame to the command unit 23.

The command unit 23 receives the control frame from the frame reception unit 22 and notifies the control frame generation unit 24 of device information on the air conditioner 60, the device information being included in the control frame. The command unit 23 outputs a control command to thereby give an instruction to the control frame generation unit 24.

The control frame generation unit 24 generates the general frame which is the control frame for controlling the air conditioner 60, the general frame not being required to be transferred with low latency as much as the low latency frame is.

The output control unit 26 performs control to transmit the general frame generated by the control frame generation unit 24 to the communication apparatus 30.

Next, the operation of the train communication system 100 will be described. In the train communication system 100, when the communication apparatus 30 receives control frames from the system control apparatuses 10 and 20, the communication apparatus 30 performs control to preferentially transfer a low latency frame which is the control frame from the system control apparatus 10. However, when a large amount of low latency frames is transmitted from the system control apparatus 10 to the communication apparatus 30, the traffic of the low latency frames in the low latency transfer processing unit 34 of the communication apparatus 30 increases with the result that some of the low latency frames are discarded due to an overflow of the buffer. To address this issue, the train communication system 100 beforehand sets, in the communication apparatus 30, the priority setting table of the control frames among which a plurality of low latency frames to be transmitted/received includes low latency frames that truly require transferring with low latency and are assigned priorities. When the traffic of the low latency frames in the low latency transfer processing unit 34 of the communication apparatus 30 becomes equal to or higher than a threshold, the train communication system 100 performs control to transfer the control frames with the priority setting table modified such that the control frames treated as the low latency frames come to be treated as the general frames in increasing order of the priority.

FIG. 5 is a table illustrating an example of the priority setting tables of control frames set in the frame identification unit 32 of the communication apparatuses 30 and 40 according to the first embodiment. The priority setting table illustrated in FIG. 5 indicates whether a control frame transmitted and received in the train communication system 100 belongs to a low latency frame or a general frame. A low latency frame having higher priority, i.e., a low latency frame that truly requires transferring with low latency, is placed higher in FIG. 5. Note that in FIG. 5, general frames need not be placed in order of priority, and the general frames and the low latency frames need not be equal in number at an initial stage. A control frame belonging to the low latency frame is given higher priority than all the control frames belonging to the general frames.

When the traffic of the low latency frames becomes equal to or higher than a threshold in the low latency transfer processing unit 34 of the communication apparatus 30, the control frame of "ZZZ" having low priority among the control frames treated as the low latency frames are treated as a general frame by the frame identification unit 32 under the control of the control unit 36. When the control frame of "ZZZ" is subsequently received, the frame identification unit 32 outputs the control frame of "ZZZ" to the general transfer processing unit 33, not to the low latency transfer processing unit 34. The communication apparatus 30 can thus reduce the traffic of the low latency frames in the low latency transfer processing unit 34.

In the example of FIG. 1, when the traffic of the low latency frames in the low latency transfer processing unit 34 of the communication apparatus 30 becomes equal to or higher than a threshold due to the low latency frames 101 and 102 transmitted from the system control apparatus 10, the low latency frame 103 would have to be discarded in a related art. In the present embodiment, when the low latency frame 103 can be treated as a general frame rather than a control frame that truly requires low latency, the communication apparatus 30 can transfer the low latency frame 103 without discarding the low latency frame 103 though the frame 103 is transferred later than the general frame 203.

A specific description will be made as to the processing in which a control frame having low priority among control frames treated as low latency frames is treated as a general frame and transferred in the train communication system 100.

FIG. 6 is a flowchart illustrating the processing in which a control frame having low priority among control frames treated as low latency frames is treated as a general frame and transferred in the train communication system 100 according to the first embodiment. Since the communication apparatuses 30 and 40 operate in similar manners, the communication apparatus 30 will be described by way of example.

The communication apparatus 30 monitors the traffic of the low latency frames in the low latency transfer processing unit 34 on the basis of an instruction from the system control apparatus 10 (step S101). The system control apparatus 10 instructs the communication apparatus 30 to start monitoring the traffic of the low latency frames after the train equipped with the train communication system 100 is started, the cars of the train split, the cars of the train are combined together, or the like.

If the traffic of the low latency frames is less than a predetermined threshold (No in step S102), the communication apparatus 30 continues monitoring the traffic of the low latency frames (step S101). The predetermined threshold is a value expressed in percentage when the traffic of the low latency frames is monitored by a method that checks the usage rate of the buffer in the low latency transfer processing unit 34, or a value indicating the number of discarded frames when the traffic of the low latency frames is monitored by a method that counts the number of discarded low latency frames. If the traffic of the low latency frames is higher than or equal to the threshold (Yes in step S102), the communication apparatus 30 generates the first notification frame indicating that the traffic of the low latency frames is higher than or equal to the threshold, and transmits the generated first notification frame to the system control apparatus 10 (step S103). The communication apparatus 30 may include a specific value of the traffic of the low latency frames in the first notification frame.

Upon receipt of the first notification frame from the communication apparatus 30, the system control apparatus 10 generates the first priority setting frame in response to the first notification frame and transmits the generated first priority setting frame to all the communication apparatuses 30 and 40 in the train communication system 100 (step S104), the first priority setting frame instructing a modification to the priority setting table in the frame identification unit 32 of the communication apparatus 30, such that the control frames treated as the low latency frames come to be treated as general frames in increasing order of the priority. When the first notification frame includes a specific value of the traffic of the low latency frames, the system control apparatus 10 may determine, on the basis of the value of the traffic of the low latency frames, that not one but a plurality of control frames treated as the low latency frames come to be treated as the general frames.

Here, when the train communication system 100 includes a plurality of communication apparatuses, the system control apparatus 10 may generate and transmit the first priority setting frame after receiving the first notification frames from two or more of the communication apparatuses. For example, the system control apparatus 10 generates and transmits the first priority setting frame when receiving the first notification frames from a predetermined number of the communication apparatuses among the plurality of communication apparatuses. The predetermined number may be a fixed number or a fixed ratio such as 50% or higher with respect to the number of the plurality of communication apparatuses. The train communication system 100 can thus transfer the control frames while excluding the first notification frame from the communication apparatus in which an abnormal traffic of the low latency frames is detected due to an unexpected factor, a failure of the apparatus, or the like.

Upon receiving the first priority setting frame from the system control apparatus 10, the control unit 36 of the communication apparatus 30 modifies the priority setting table of the frame identification unit 32 on the basis of the first priority setting frame such that the control frames treated as the low latency frames come to be treated as the general frames in increasing order of the priority (step S105). Of the control frames treated as the low latency frames, the control frame of "ZZZ" having low priority is treated as the general frame by the frame identification unit 32 under the control of the control unit 36, as described above. When the control frame of "ZZZ" is received, the frame identification unit 32 outputs the control frame of "ZZZ" to the general transfer processing unit 33 on the basis of the modified priority setting table. The communication apparatus 30 can thus reduce the traffic of the low latency frames in the low latency transfer processing unit 34.

The communication apparatus 30 and the system control apparatus 10 repeat the processing from step S101 to step S105 until the traffic of the low latency frames becomes less than the threshold (No in step S102). If the traffic of the low latency frames is still higher than or equal to the threshold in the next processing as well (Yes in step S102), the control unit 36 of the communication apparatus 30 performs the processing in each of steps S103 and S104, thereby modifying the priority setting table of the frame identification unit 32 such that the control frames treated as the low latency frames come to be treated as the general frames in increasing order of the priority (step S105). In particular, a control frame of "YYY" having the lowest priority except for the control frame of "ZZZ" among the control frames treated as the low latency frames is treated as the general frame by the frame identification unit 32 under the control of the control unit 36.

The communication apparatus 30 modifies the priority setting table on the basis of the traffic of the low latency frames as described above, thereby enabling the train communication system 100 to reduce discarding of the low latency frames while reducing latency of the low latency frame that truly requires low latency.

The transfer processing of the train communication system 100 illustrated in FIG. 6 will be described with reference to the communication apparatus 30 and the system control apparatus 10.

FIG. 7 is a flowchart illustrating processing performed by the communication apparatuses 30 and 40 when a control frame having low priority among the control frames treated as the low latency frames is treated as a general frame and transferred in the train communication system 100 according to the first embodiment. Since the communication apparatuses 30 and 40 operate in similar manners, the communication apparatus 30 will be described by way of example.

The frame identification unit 32 of the communication apparatus 30 receives, from the system control apparatus 10, a monitoring start instruction frame which gives an instruction to start monitoring the traffic of the low latency frames in the low latency transfer processing unit 34 (step S201). The frame identification unit 32 transfers the monitoring start instruction frame to the control unit 36 via the low latency transfer processing unit 34 and the output control unit 35.

After receiving the monitoring start instruction frame, the control unit 36 starts monitoring the traffic of the low latency frames in the low latency transfer processing unit 34 (step S202). That is, the system control apparatus 10 instructs the control unit 36 to start monitoring the traffic of the low latency frames, on the basis of which the control unit 36 starts monitoring the traffic of the low latency frames. If the traffic of the low latency frames is less than a threshold (No in step S203), the control unit 36 continues monitoring the traffic of the low latency frames (step S202). If the traffic of the low latency frames is higher than or equal to the threshold (Yes in step S203), the control unit 36 generates the first notification frame and transmits the generated first notification frame to the system control apparatus 10 via the frame identification unit 32, the general transfer processing unit 33 or the low latency transfer processing unit 34, and the output control unit 35 (step S204).

In the communication apparatus 30, the control unit 36 waits until receiving the first priority setting frame from the system control apparatus 10 (No in step S205). Upon receiving the first priority setting frame from the system control apparatus 10 (Yes in step S205), the frame identification unit 32 of the communication apparatus 30 transfers the first priority setting frame to the control unit 36 via the low latency transfer processing unit 34 and the output control unit 35. Upon receiving the first priority setting frame, the control unit 36 modifies the priority setting table of the frame identification unit 32 on the basis of the first priority setting frame such that the control frames treated as the low latency frames come to be treated as the general frames in increasing order of the priority (step S206). The communication apparatus 30 repeats the processing from step S202 to step S206 until the traffic of the low latency frames becomes less than the threshold (No in step S203).

Figure 8:
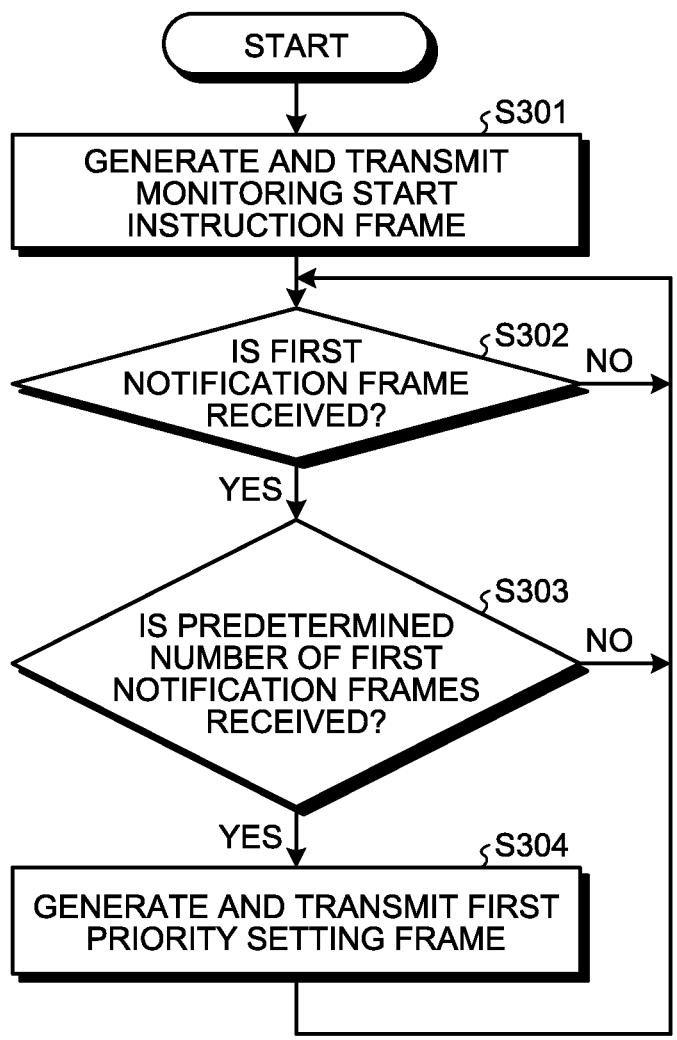
FIG. 8 is a flowchart illustrating processing performed by the system control apparatus when a control frame having low priority among control frames treated as low latency frames is treated as a general frame and transferred in the train communication system according to the first embodiment.

FIG. 8 is a flowchart illustrating processing performed by the system control apparatus 10 when a control frame having low priority among the control frames treated as the low latency frames is treated as a general frame and transferred in the train communication system 100 according to the first embodiment.

In the system control apparatus 10, the command unit 13 instructs the priority setting frame generation unit 15 to generate the monitoring start instruction frame after the train equipped with the train communication system 100 is started, the cars of the train split, or the cars of the train are combined together. The monitoring start instruction frame instructs the communication apparatuses 30 and 40 to start monitoring the traffic of the low latency frames. The priority setting frame generation unit 15 generates the monitoring start instruction frame on the basis of the instruction from the command unit 13. Then, the output control unit 16 transmits, to the communication apparatus 30, the monitoring start instruction frame generated by the priority setting frame generation unit 15 (step S301).

In the system control apparatus 10, the frame reception unit 12 waits until receiving the first notification frames from the communication apparatuses 30 and 40 (No in step S302). Upon receiving the first notification frames from the communication apparatuses 30 and 40 (Yes in step S302), the frame reception unit 12 transfers the first notification frames to the command unit 13.

In the system control apparatus 10, the command unit 13 waits until receiving a predetermined number of the first notification frames (No in step S303). Upon receiving the predetermined number of first notification frames (Yes in step S303), the command unit 13 instructs the priority setting frame generation unit 15 to generate the first priority setting frame in response to the first notification frame. The first priority setting frame instructs a modification to the priority setting table, which is set in the communication apparatuses 30 and 40 and indicates the priorities of the control frames, such that the control frames treated as the low latency frames come to be treated as the general frames in increasing order of the priority. The priority setting frame generation unit 15 generates the first priority setting frame on the basis of the instruction from the command unit 13. The output control unit 16 transmits, to the communication apparatuses 30 and 40, the first priority setting frame generated by the priority setting frame generation unit 15 (step S304). The system control apparatus 10 repeats the processing from step S302 to step S304.

Note that the system control apparatus 10 transmits the first priority setting frame to all the communication apparatuses in the train communication system 100 when the priority setting table of the communication apparatus in the train communication system 100 is modified. However, the system control apparatus 10 may transmit the first priority setting frame only to the communication apparatus transmitting the first notification frame. In this case, only the communication apparatus transmitting the first notification frame and receiving the first priority setting frame modifies the priority setting table. The similar applies to the following embodiments.

Moreover, when the number of cars of the train is changed by splitting of the train or combination of the trains, the communication apparatus in the train communication system 100 may reset the content of the priority setting table and restore the table to the initial state or, without resetting, each communication apparatus may have the same content in the priority setting table when first receiving the first priority setting frame. The similar applies to the following embodiments.

Next, the hardware configuration of the communication apparatuses 30 and 40 will be described. In the communication apparatuses 30 and 40, the switch 31 is implemented by a switch circuit capable of transferring an Ethernet frame. The control unit 36 is implemented by a processing circuit. That is, the communication apparatuses 30 and 40 each include a processing circuit for making a modification such that the control frames treated as the low latency frames come to be treated as the general frames in increasing order of the priority when the communication apparatuses 30 and 40 transfer the control frames. The processing circuit may be dedicated hardware, or a memory and a central processing unit (CPU) executing a program stored in the memory.

Figure 9:
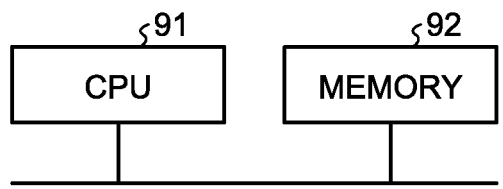
FIG. 9 is a diagram illustrating an example of a case where a processing circuit of the communication apparatus according to the first embodiment includes a CPU and a memory.

FIG. 9 is a diagram illustrating an example of the case where the processing circuit of each of the communication apparatuses 30 and 40 according to the first embodiment includes the CPU and the memory. When the processing circuit includes a CPU 91 and a memory 92, the functions of each of the communication apparatuses 30 and 40 are implemented by software, firmware, or a combination of software and firmware. The software or firmware is described as programs and stored in the memory 92. The processing circuit implements the functions by the CPU 91 reading and executing the programs stored in the memory 92. That is, the communication apparatuses 30 and 40 each include the memory 92 for storing the programs which, when executed, performs a step for making the modification such that the control frames treated as the low latency frames come to be treated as the general frames in increasing order of the priority when the control frames are transferred. In other words, these programs cause a computer to execute procedures and methods of the communication apparatuses 30 and 40. The CPU 91 may be a processing unit, an arithmetic unit, a microprocessor, a microcomputer, a processor, or a digital signal processor (DSP). The memory 92 corresponds to a non-volatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disc, or a digital versatile disc (DVD).

Figure 10:
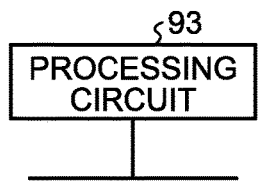
FIG. 10 is a diagram illustrating an example of a case where the processing circuit of the communication apparatus according to the first embodiment includes dedicated hardware.

FIG. 10 is a diagram illustrating an example of the case where the processing circuit of each of the communication apparatuses 30 and 40 according to the first embodiment includes dedicated hardware. When implemented as dedicated hardware, a processing circuit 93 illustrated in FIG. 10 corresponds to a single circuit, a complex circuit, a programmed processor, a parallel-programmed processor, an application specific integrated circuit (ASIC), a field programmable gate array (FPGA), or a combination of those, for example. The functions of each of the communication apparatuses 30 and 40 may be implemented individually or collectively by the processing circuit 93.

Note that the functions of the processing circuit of each of the communication apparatuses 30 and 40 may be implemented partly by dedicated hardware and partly by software or firmware. The processing circuit can thus implement the aforementioned functions by dedicated hardware, software, firmware, or a combination of these.

As for the system control apparatus 10, the hardware configuration of the command unit 13 and the priority setting frame generation unit 15 that are different from the conventional system control apparatus 20 can be explained with reference to FIGS. 9 and 10 as with the hardware configuration of the communication apparatuses 30 and 40.

According to the present embodiment, as described above, the communication apparatuses 30 and 40 of the train communication system 100 each monitor the traffic of the low latency frames in the low latency transfer processing unit 34, and when the traffic of the low latency frames becomes equal to or higher than the threshold, the communication apparatuses modifies the content of the priority setting table under the control of the system control apparatus 10 such that the control frames treated handled as the low latency frames come to be treated as the general frames in increasing order of the priority. The communication apparatuses 30 and 40 can thus reduce the traffic of the low latency frames in the low latency transfer processing unit 34 and reduce discarding of Ethernet frames while reducing latency of an Ethernet frame that truly requires low latency.

Second Embodiment

The first embodiment makes the modification such that the control frames treated as the low latency frames come to be treated as the general frames in increasing order of the priority. A second embodiment makes a modification such that a control frame, which was treated as a general frame, is treated as a low latency frame again. The second embodiment differs from the first embodiment in the respects as will be described below. Note that the configurations of the train communication system 100, the system control apparatuses 10 and 20, and the communication apparatuses 30 and 40 are similar to those of the first embodiment.

Figure 11:
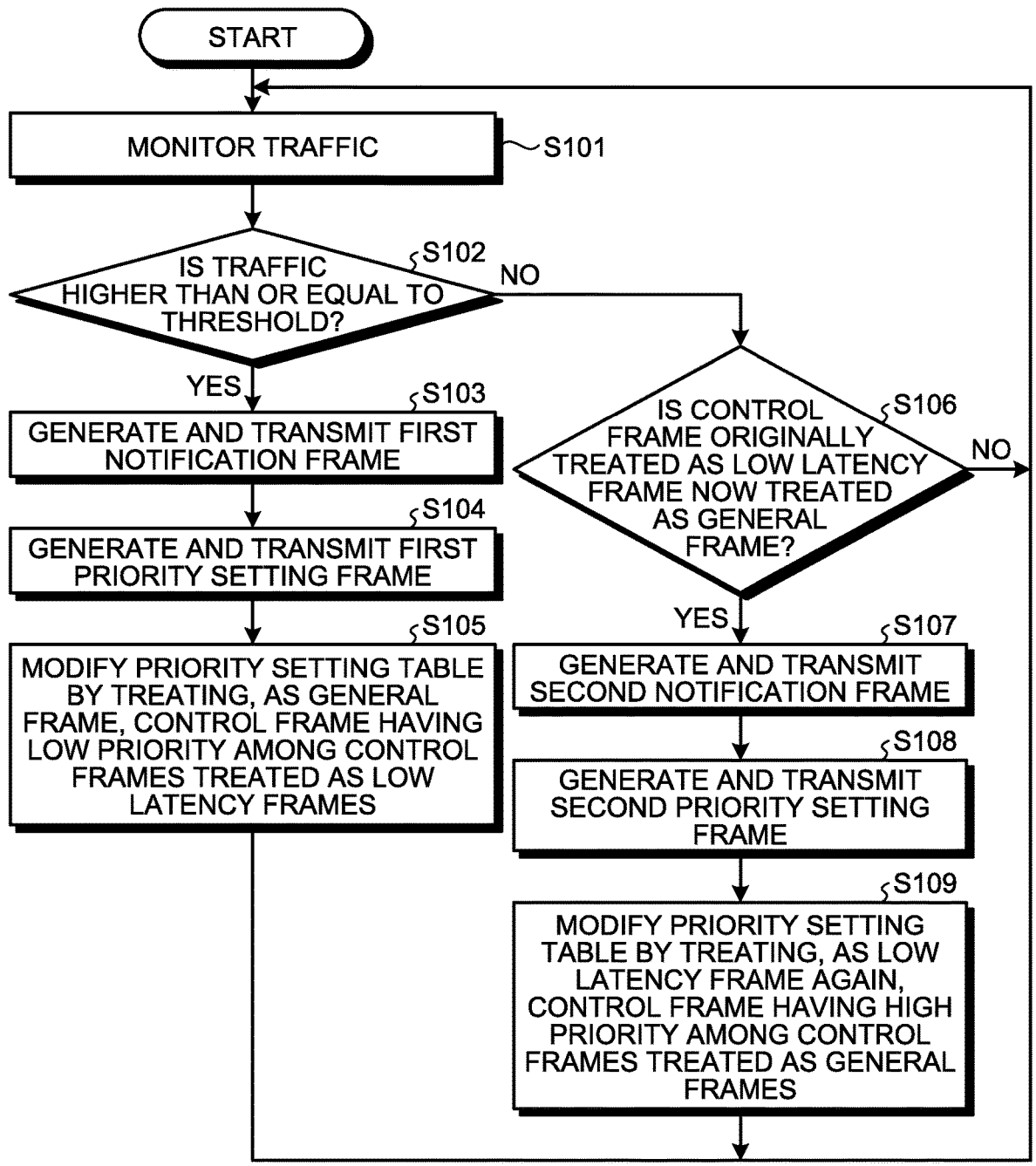
FIG. 11 is a flowchart illustrating processing in which a control frame having high priority among control frames treated as general frames is treated as a low latency frame again and transferred in the train communication system according to a second embodiment.

FIG. 11 is a flowchart illustrating processing in which a control frame having high priority among control frames treated as general frames is treated as a low latency frame again and transferred in the train communication system 100 according to the second embodiment. Since the communication apparatuses 30 and 40 operate in similar manners, the communication apparatus 30 will be described by way of example. The processing from step S101 to step S105 in FIG. 11 is similar to that in the flowchart of the first embodiment illustrated in FIG. 6.

If the traffic of the low latency frames is less than the threshold (No in step S102), the communication apparatus 30 checks whether a control frame, which was treated as a low latency frame, has been treated as a general frame in the processing of step S105 (step S106). If the control frame, which was treated as the low latency frame, is not treated as the general frame (No in step S106), the communication apparatus 30 continues monitoring the traffic of the low latency frames (step S101).

If the control frame, which was treated as the low latency frame, has been treated as the general frame (Yes in step S106), the communication apparatus 30 generates a second notification frame indicating that the traffic of the low latency frames is less than the threshold, and transmits the generated second notification frame to the system control apparatus 10 (step S107). The communication apparatus 30 may include a specific value of the traffic of the low latency frames in the second notification frame.

Upon receiving the second notification frame from the communication apparatus 30, the system control apparatus 10 generates a second priority setting frame in response to the second notification frame, and transmits the generated second priority setting frame to all the communication apparatuses 30 and 40 of the train communication system 100 (step S108). The second priority setting frame is a control frame instructing a modification to the priority setting table of the frame identification unit 32 of the communication apparatus 30, such that the control frames, which were originally treated as the low latency frames but have been treated as the general frames, come to be treated as low latency frames again in decreasing order of the priority. When the second notification frame includes a specific value of the traffic of the low latency frames, the system control apparatus 10 may specify not one but a plurality of control frames on the basis of the value of the traffic of the low latency frames, so as to allow the specified plural control frames treated as the general frames to be treated as the low latency frames again.

As with the first embodiment, when the train communication system 100 includes a plurality of communication apparatuses, the system control apparatus 10 may generate and transmit the second priority setting frame after receiving the second notification frames from two or more of the communication apparatuses. For example, the system control apparatus 10 generates and transmits the second priority setting frame when receiving the second notification frames from a predetermined number of the communication apparatuses among the plurality of communication apparatuses. The train communication system 100 can thus transfer the control frames while excluding the second notification frame coming from the communication apparatus in which an abnormal traffic of the low latency frames is detected due to an unexpected factor, a failure of the apparatus, or the like.

Upon receiving the second priority setting frame from the system control apparatus 10, the control unit 36 of the communication apparatus 30 modifies the priority setting table of the frame identification unit 32 on the basis of the second priority setting frame, such that the control frames having been treated as the general frames come to be treated as the low latency frames again in decreasing order of the priority (step S109).

For example, assume that the control frames of "ZZZ" and "YYY" having low priority among the control frames originally treated as the low latency frames have been treated as the general frames by the frame identification unit 32 under the control of the control unit 36 of the first embodiment. Under the control of the control unit 36 receiving the second priority setting frame, the frame identification unit 32 modifies the priority setting table such that the control frame of "YYY", which is higher in priority than "ZZZ" and has been treated as the general frame, come to be treated as the low latency frame again. When the control frame of "YYY" is received, the frame identification unit 32 outputs the control frame of "YYY" to the low latency transfer processing unit 34 on the basis of the modified priority setting table. The communication apparatus 30 can thus allow the control frame treated as the general frame to be treated as the low latency frame again when the traffic of the low latency frames is reduced, thereby achieving transfer with low latency.

The transfer processing of the train communication system 100 illustrated in FIG. 11 will be described with reference to the communication apparatus 30 and the system control apparatus 10.

Figure 12:
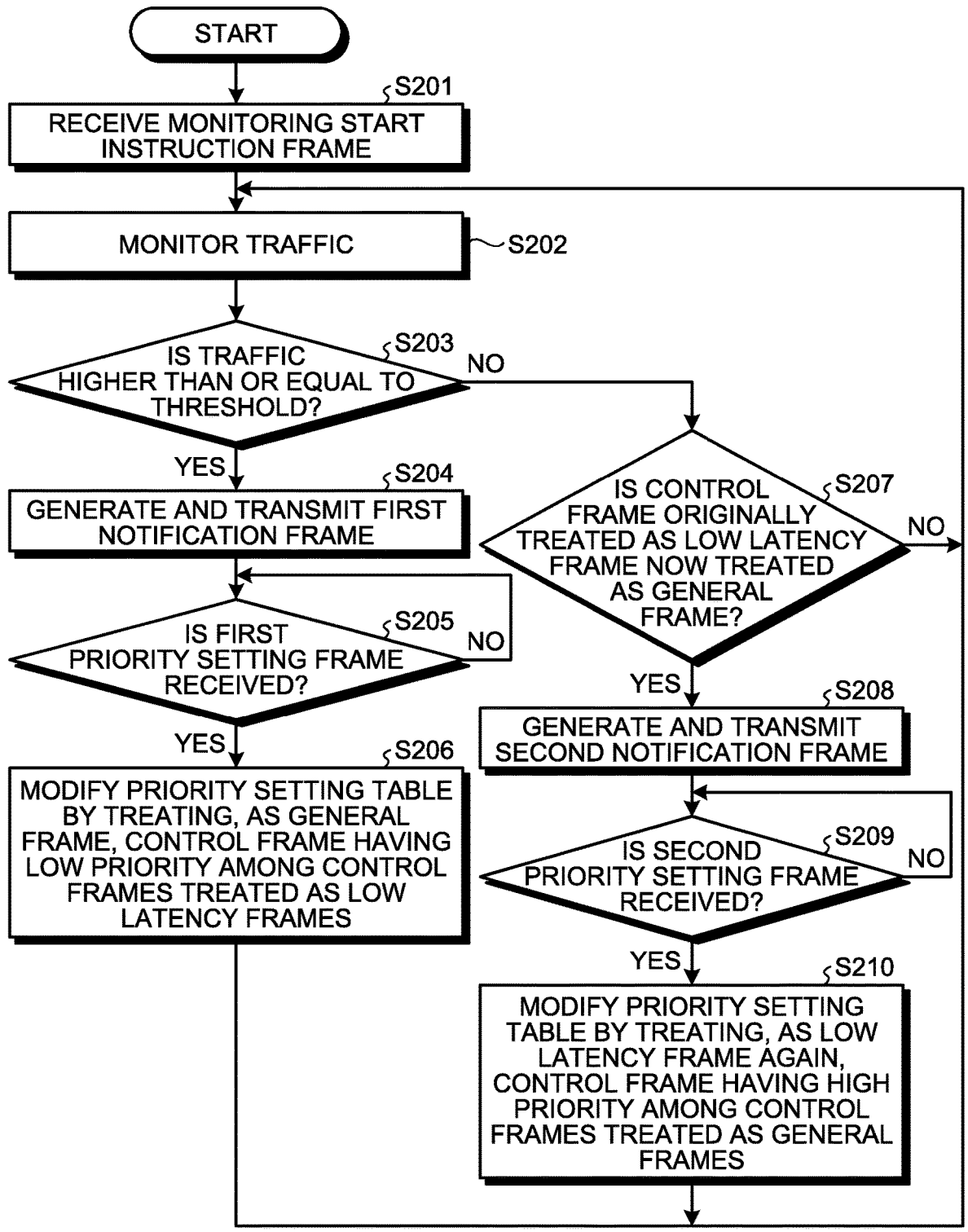
FIG. 12 is a flowchart illustrating processing performed by the communication apparatus when a control frame having high priority among control frames treated as general frames is treated as a low latency frame again and transferred in the train communication system according to the second embodiment.

FIG. 12 is a flowchart illustrating processing performed by the communication apparatuses 30 and 40 when a control frame having high priority among the control frames treated as the general frames is treated as a low latency frame again and transferred in the train communication system 100 according to the second embodiment. Since the communication apparatuses 30 and 40 operate in similar manners, the communication apparatus 30 will be described by way of example. The processing from step S201 to step S206 in FIG. 12 is similar to that in the flowchart of the first embodiment illustrated in FIG. 7.

The control unit 36 monitors the traffic of the low latency frames even after modifying the priority setting table. If the traffic of the low latency frames is less than the threshold (No in step S203), the control unit 36 checks whether a control frame, which was treated as a low latency frame, has been treated as a general frame in the processing of step S206 (step S207). If a control frame, which was treated as a low latency frame, is not treated as a general frame (No in step S207), the control unit 36 continues monitoring the traffic of the low latency frames (step S202).

If a control frame, which was treated as a low latency frame, has been treated as a general frame (Yes in step S207), the control unit 36 generates the second notification frame and transmits the generated second notification frame to the system control apparatus 10 via the frame identification unit 32, the general transfer processing unit 33 or the low latency transfer processing unit 34, and the output control unit 35 (step S208).

In the communication apparatus 30, the control unit 36 waits until receiving the second priority setting frame from the system control apparatus 10 (No in step S209). Upon receiving the second priority setting frame from the system control apparatus 10 (Yes in step S209), the frame identification unit 32 of the communication apparatus 30 transfers the second priority setting frame to the control unit 36 via the low latency transfer processing unit 34 and the output control unit 35. Upon receiving the second priority setting frame, the control unit 36 modifies the priority setting table of the frame identification unit 32 on the basis of the second priority setting frame such that the control frames, which have been treated as the general frames, come to be treated as the low latency frames again in decreasing order of the priority (step S210).

Figure 13:
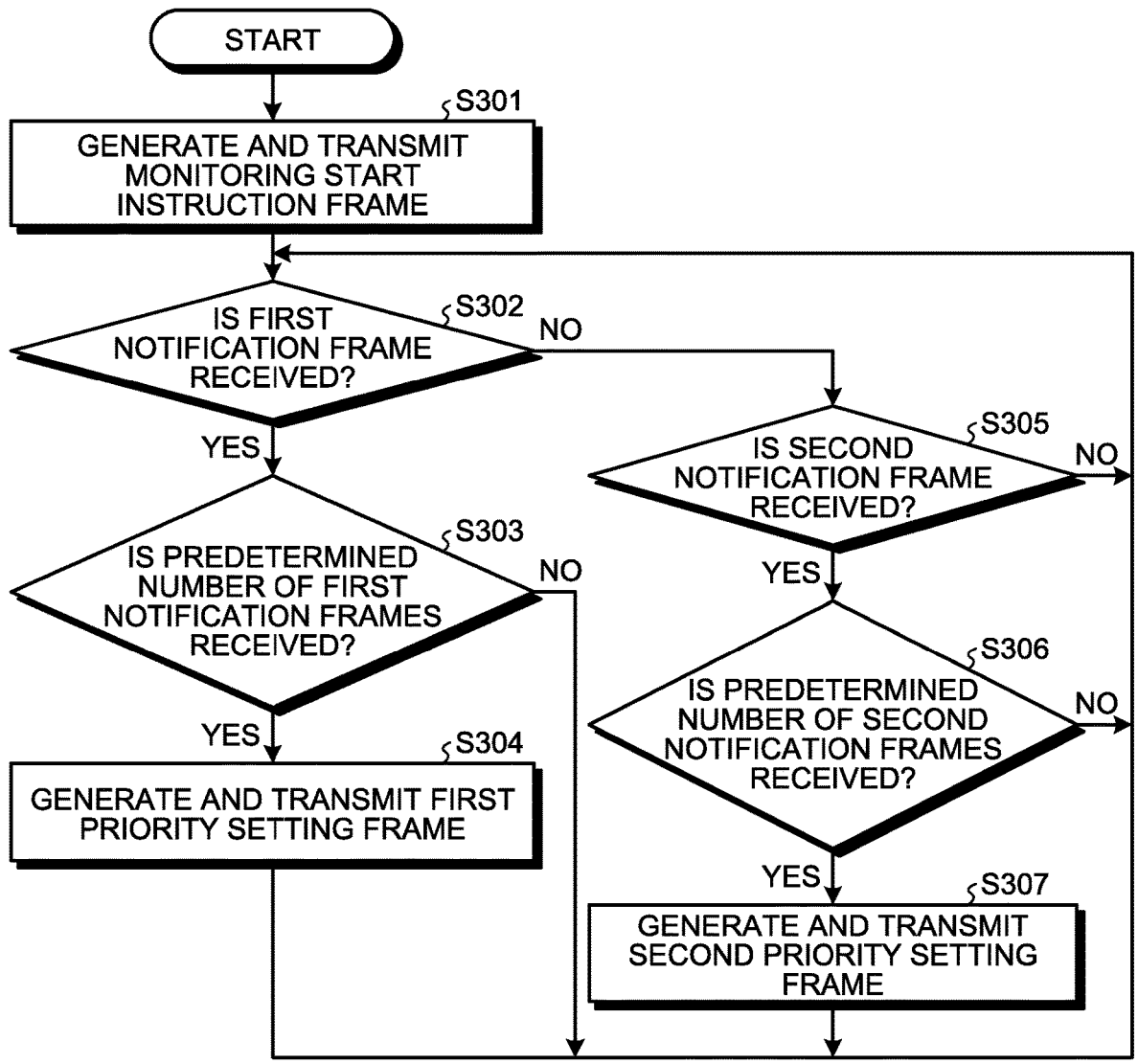
FIG. 13 is a flowchart illustrating processing performed by the system control apparatus when a control frame having high priority among control frames treated as general frames is treated as a low latency frame again and transferred in the train communication system according to the second embodiment.

FIG. 13 is a flowchart illustrating processing performed by the system control apparatus 10 when a control frame having high priority among the control frames treated as the general frames is handled as a low latency frame again and transferred in the train communication system 100 according to the second embodiment. The processing from step S301 to step S304 in FIG. 13 is similar to that in the flowchart of the first embodiment illustrated in FIG. 8.

In the system control apparatus 10, the frame reception unit 12 checks whether the second notification frame is received (step S305) if the first notification frames are not received from the communication apparatuses 30 and 40 (No in step S302). If the second notification frame is not received (No in step S305), the frame reception unit 12 returns to the processing of step S302. Upon receiving the second notification frames from the communication apparatuses 30 and 40 (Yes in step S305), the frame reception unit 12 transfers the second notification frame to the command unit 13.

In the system control apparatus 10, the command unit 13 waits until receiving a predetermined number of the second notification frames (No in step S306). Upon receiving the predetermined number of second notification frames (Yes in step S306), the command unit 13 instructs the priority setting frame generation unit 15 to generate the second priority setting frame in response to the second notification frame. The second priority setting frame instructs a modification to the priority setting table such that the control frames, which have been treated as the general frames, come to be treated as the low latency frames again in decreasing order of the priority. The priority setting frame generation unit 15 generates the second priority setting frame on the basis of the instruction from the command unit 13. The output control unit 16 transmits, to the communication apparatuses 30 and 40, the second priority setting frame generated by the priority setting frame generation unit 15 (step S307).

According to the present embodiment, as described above, when the traffic of the low latency frames becomes less than the threshold after the communication apparatuses 30 and 40 of the train communication system 100 have treated, as the general frames, the control frames that were originally treated as the low latency frames, the communication apparatuses modify the content of the priority setting table under the control of the system control apparatus 10 such that the control frames, which were originally treated as the low latency frames but have been treated as the general frames, come to be treated as the low latency frames again in decreasing order of the priority. The communication apparatuses 30 and 40 can thus allow the control frame, which should be originally treated and transferred as the low latency frame but has been treated as the general frame, to be treated as the low latency frame again and transferred when the traffic of the low latency frames in the low latency transfer processing unit 34 is reduced. As a result, the control frame can be transferred with low latency.

Third Embodiment

In the first and second embodiments, the communication apparatus 30 continuously monitors the low latency frames when the system control apparatus 10 instructs the communication apparatus 30 to start monitoring the traffic of the low latency frames. A third embodiment assumes that cars of the train split or are combined together. In particular, in the third embodiment, the communication apparatuses 30 and 40 monitor the traffic of the low latency frames for a predetermined period after the splitting or combination. The third embodiment differs from the first and second embodiments in the respects as will be described below. Note that the configurations of the train communication system 100, the system control apparatuses 10 and 20, and the communication apparatuses 30 and 40 are similar to those of the first and second embodiments.

Figure 14:
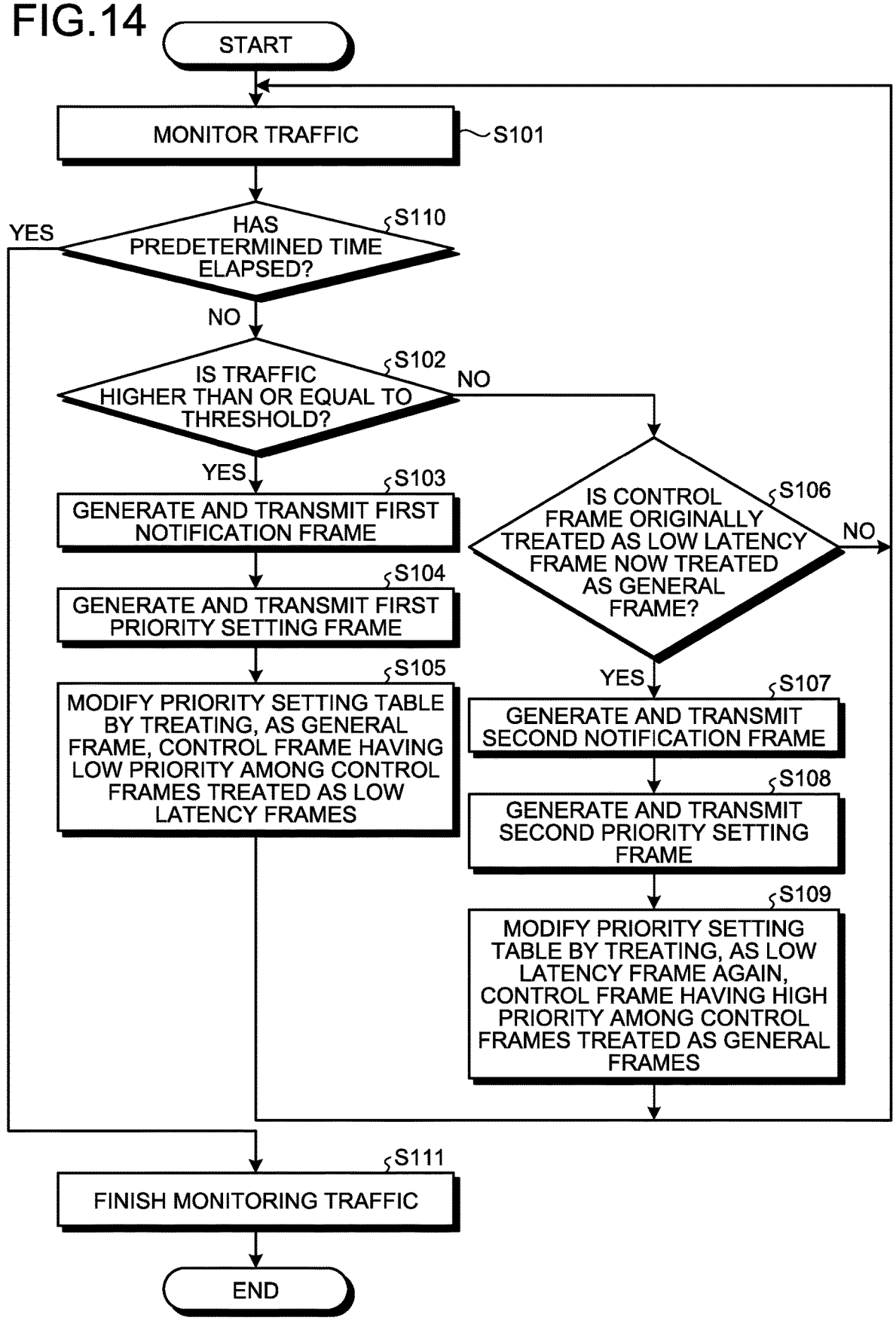
FIG. 14 is a flowchart illustrating transfer processing in which monitoring of traffic of low latency frames is finished after a predetermined time elapses from start of the monitoring in the train communication system according to a third embodiment.

FIG. 14 is a flowchart illustrating transfer processing in which monitoring of the traffic of the low latency frames is finished after a predetermined time elapses from the start of monitoring in the train communication system 100 according to the third embodiment. Since the communication apparatuses 30 and 40 operate in similar manners, the communication apparatus 30 will be described by way of example. The processing from step S101 to step S109 in FIG. 14 is similar to that in the flowchart of the second embodiment illustrated in FIG. 11.

The communication apparatus 30 proceeds to processing of step S102 if a monitoring end instruction frame which gives an instruction to finish monitoring the traffic of the low latency frames is not received from the system control apparatus 10, that is, if a predetermined time has not elapsed since start of monitoring of the traffic of the low latency frames (No in step S110) during the monitoring of the traffic of the low latency frames in the low latency transfer processing unit 34 (step S101). The subsequent processing is similar to that of the second embodiment. If the monitoring end instruction frame is received from the system control apparatus 10, that is, if the predetermined time has elapsed since start of monitoring of the traffic of the low latency frames (Yes in step S110), the communication apparatus 30 finishes monitoring the traffic of the low latency frames in the low latency transfer processing unit 34 (step S111), and ends the processing.

Figure 15:
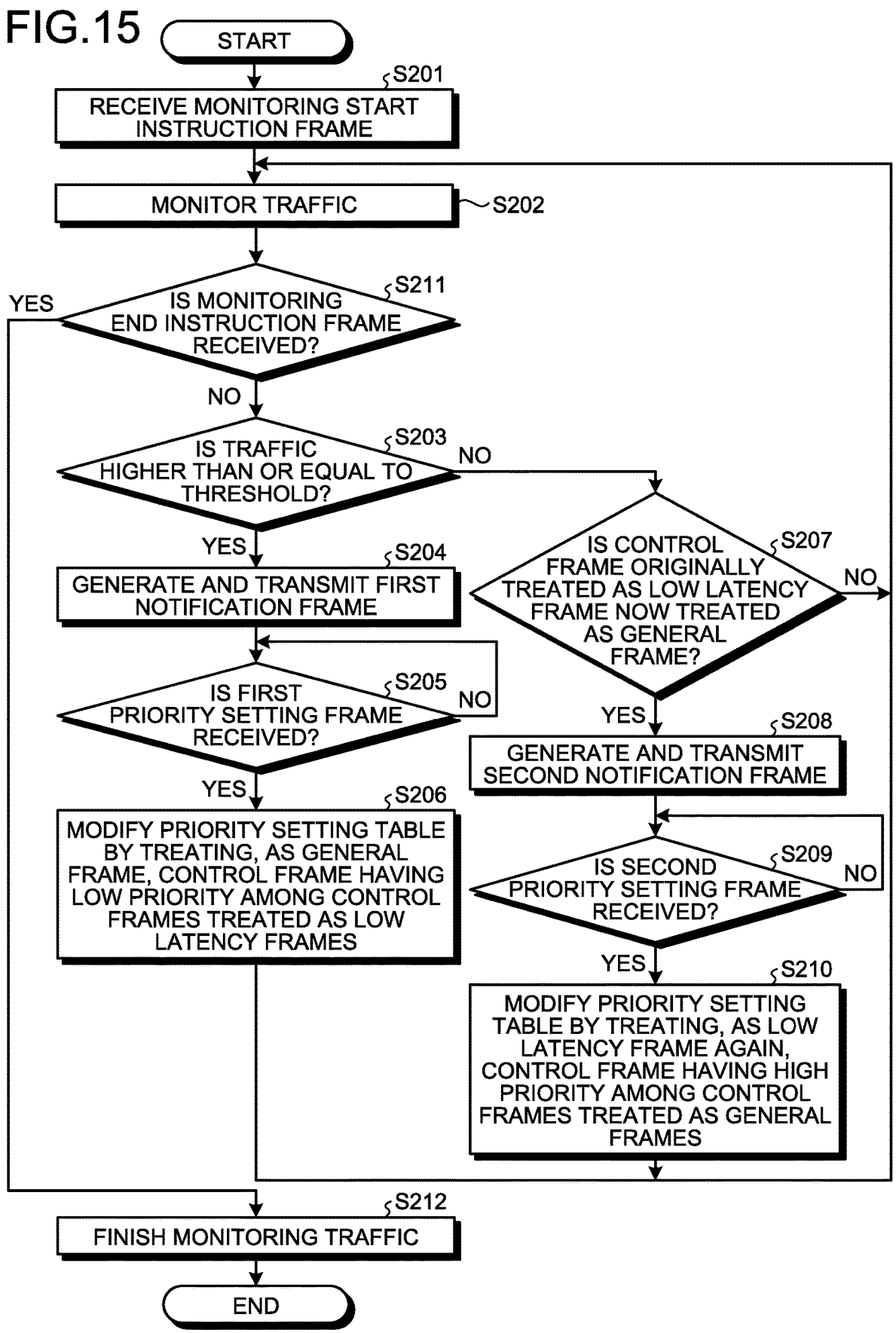
FIG. 15 is a flowchart illustrating processing performed by the communication apparatus in which processing the monitoring of traffic of low latency frames is finished after a predetermined time elapses from start of the monitoring in the train communication system according to the third embodiment.

FIG. 15 is a flowchart illustrating processing performed by the communication apparatuses 30 and 40 in which processing the monitoring of the traffic of the low latency frames is finished after a predetermined time elapses from the start of monitoring in the train communication system 100 according to the third embodiment. Since the communication apparatuses 30 and 40 operate in similar manners, the communication apparatus 30 will be described by way of example. The processing from step S201 to step S210 in FIG. 15 is similar to that in the flowchart of the second embodiment illustrated in FIG. 12.

The control unit 36 of the communication apparatus 30 proceeds to processing of step S203 as the control unit 36 determines that the predetermined time has not elapsed since start of monitoring of the traffic of the low latency frames, if the monitoring end instruction frame is not received from the system control apparatus 10 (No in step S211) during the monitoring of the traffic of the low latency frames in the low latency transfer processing unit 34 (step S202). The subsequent processing is similar to that of the second embodiment. If the monitoring end instruction frame is received from the system control apparatus 10 (Yes in step S211), the control unit 36 determines that the predetermined time has elapsed since start of monitoring of the traffic of the low latency frames and finishes monitoring the traffic of the low latency frames in the low latency transfer processing unit 34 (step S212), which in turn ends the processing. That is, the control unit 36 finishes monitoring the traffic of the low latency frames on the basis of the instruction from the system control apparatus 10 to finish monitoring the traffic of the low latency frames.

Figure 16:
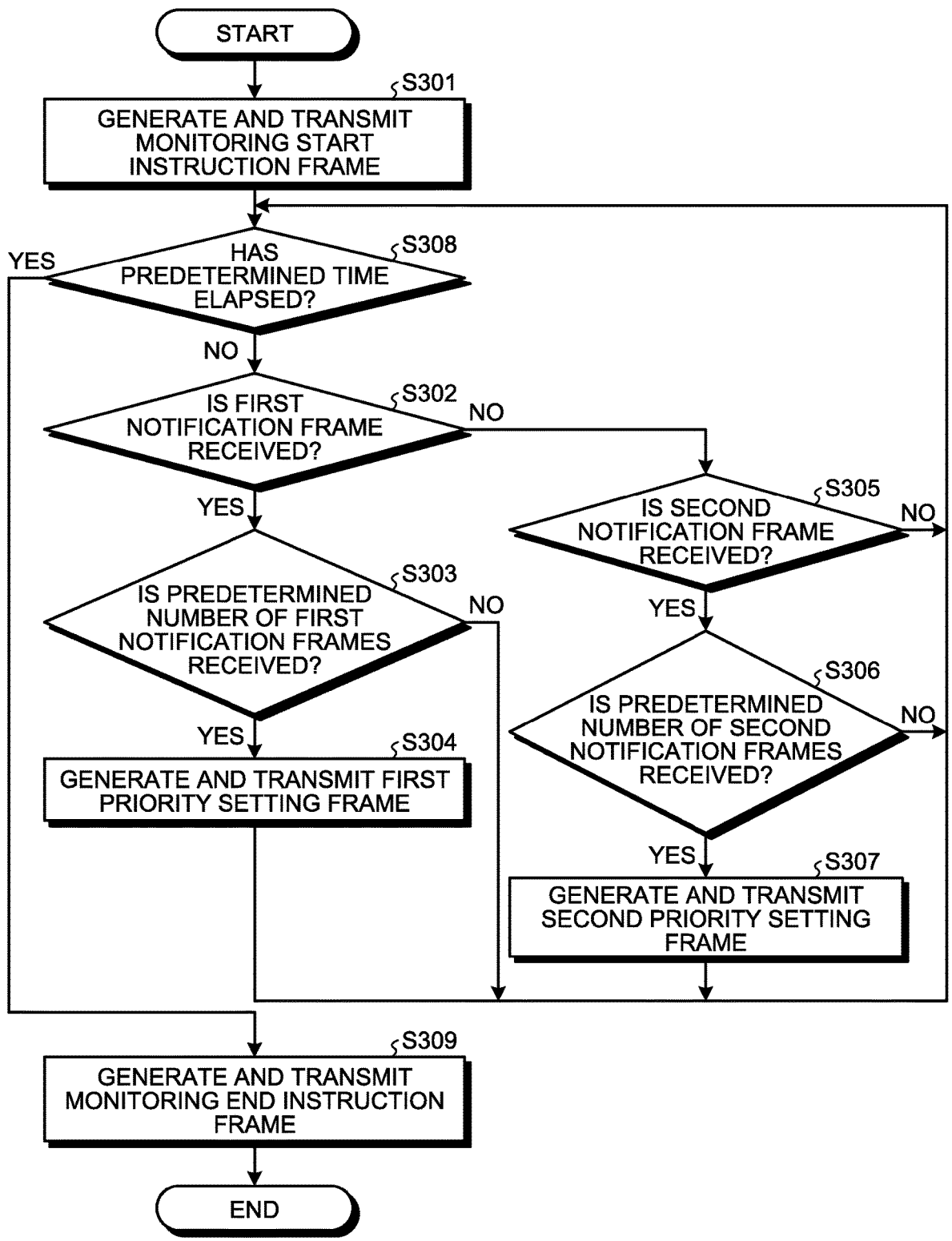
FIG. 16 is a flowchart illustrating processing performed by the system control apparatus in which processing the monitoring of traffic of low latency frames is finished after a predetermined time elapses from start of the monitoring in the train communication system according to the third embodiment.

FIG. 16 is a flowchart illustrating processing performed by the system control apparatus 10 in which processing the monitoring of the traffic of the low latency frames is finished after a predetermined time elapses from the start of monitoring in the train communication system 100 according to the third embodiment. The processing from step S301 to step S307 in FIG. 16 is similar to that in the flowchart of the second embodiment illustrated in FIG. 13.

Before checking whether the first notification frame is received in step S302, the command unit 13 checks whether a predetermined time has elapsed since the transmission of the monitoring start instruction frame (step S308). The processing proceeds to step S302 if the predetermined time has not elapsed (No in step S308). The subsequent processing is similar to that of the second embodiment. If the predetermined time has elapsed (Yes in step S308), the command unit 13 instructs the priority setting frame generation unit 15 to generate the monitoring end instruction frame which instructs the communication apparatuses 30 and 40 to finish monitoring the traffic of the low latency frames. The priority setting frame generation unit 15 generates the monitoring end instruction frame on the basis of the instruction from the command unit 13. Then, the output control unit 16 transmits, to the communication apparatus 30, the monitoring end instruction frame generated by the priority setting frame generation unit 15 (step S309).

According to the present embodiment, as described above, the communication apparatuses 30 and 40 of the train communication system 100 finish the monitoring of the traffic of the low latency frames after the lapse of the predetermined time from the start of the monitoring in the case where the cars of the train split or are combined together. The monitoring of the traffic of the low latency frames within the predetermined time enables the communication apparatuses 30 and 40 to modify the priority setting table in correspondence to the train set, i.e., the number of cars of the train when the traffic of the low latency frames is increased or decreased depending on the number of cars of the train, and, as compared to the continuous monitoring of the traffic of the low latency frames, reduce the processing load in monitoring the traffic of the low latency frames at the time of normal operation.

Fourth Embodiment

In the first to third embodiments, the communication apparatuses 30 and 40 monitor the traffic of the low latency frames and, when the traffic of the low latency frames reaches the threshold, transmits the first notification frame to the system control apparatus 10, after which the communication apparatuses 30 and 40 modify the priority setting tables on the basis of the first priority setting frame received from the system control apparatus 10. In a fourth embodiment, when the traffic of the low latency frames becomes equal to or higher than the threshold, the communication apparatus 30 modifies its own priority setting table without transmitting or receiving a control frame to or from the system control apparatus 10. The fourth embodiment differs from the first to third embodiments in the respects as will be described below.

In the fourth embodiment, the configurations of the train communication system 100, the system control apparatuses 10 and 20, and the communication apparatuses 30 and 40 are similar to those of the first to third embodiments. However, the priority setting frame generation unit 15 of the system control apparatus 10 need not include the function of generating the first priority setting frame and the second priority setting frame.

In the first to third embodiments, when the traffic of the low latency frames in any of the communication apparatuses becomes equal to or higher than the threshold, the system control apparatus 10 receives the first notification frame and transmits the first priority setting frame of the same content to each of the communication apparatuses of the train communication system 100. In the fourth embodiment, when the traffic of the low latency frames in the communication apparatuses 30 and 40 becomes equal to or higher than the threshold, each of the communication apparatuses performs control modifying only its own priority setting table. That is, in the train communication system 100, each of the communication apparatuses 30 and 40 independently modifies its own priority setting table.

Figure 17:
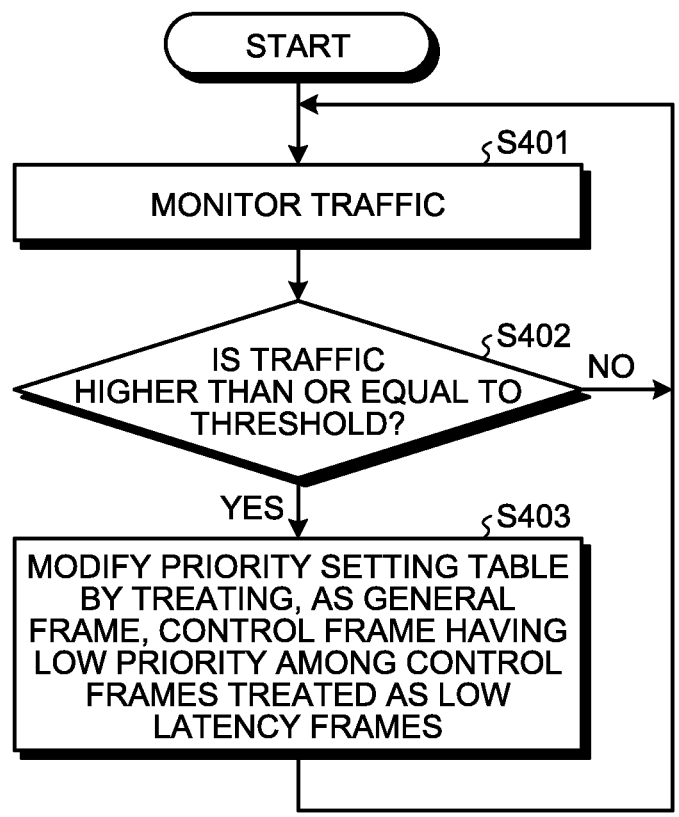
FIG. 17 is a flowchart illustrating processing in which a control frame having low priority among control frames treated as low latency frames is treated as a general frame and transferred by the communication apparatus of the train communication system according to a fourth embodiment.

FIG. 17 is a flowchart illustrating processing in which a control frame having low priority among the control frames treated as the low latency frames is treated as a general frame and transferred by the communication apparatuses 30 and 40 of the train communication system 100 according to the fourth embodiment. Since the communication apparatuses 30 and 40 operate in similar manners, the communication apparatus 30 will be described by way of example.

The control unit 36 of the communication apparatus 30 monitors the traffic of the low latency frames in the low latency transfer processing unit 34 (step S401). The control unit 36 starts monitoring the traffic of the low latency frames after the train equipped with the train communication system 100 is started, the cars of the train split, or the cars of the train are combined together. The communication apparatus 30 may determine, on its own, the timing at which to start monitoring the traffic of the low latency frames, on the basis of the number of control frames received, or by receiving the monitoring start instruction frame from the system control apparatus 10.

If the traffic of the low latency frames is less than the threshold (No in step S402), the control unit 36 continues monitoring the traffic of the low latency frames (step S401). If the traffic of the low latency frames is higher than or equal to the threshold (Yes in step S402), the control unit 36 modifies the priority setting table of the frame identification unit 32 such that the control frames treated as the low latency frames come to be treated as the general frames in increasing order of the priority (step S403).

According to the present embodiment, as described above, the communication apparatuses 30 and 40 of the train communication system 100 each monitor the traffic of the low latency frames in the low latency transfer processing unit 34, and when the traffic of the low latency frames becomes equal to or higher than the threshold, the communication apparatuses modify the content of the priority setting table such that the control frames treated as the low latency frames come to be treated as the general frames in increasing order of the priority. The communication apparatuses 30 and 40 can thus reduce the traffic of the low latency frames in the low latency transfer processing unit 34 and reduce discarding of Ethernet frames while reducing latency of an Ethernet frame that truly requires low latency. The communication apparatuses 30 and 40, which neither transmits the first notification frame nor receives the first priority setting frame, can reduce the processing load as compared to the first embodiment.

Since the system control apparatus 10 does not transmit the first priority setting frame, the system control apparatus 10 can reduce the processing load as compared to the first embodiment. Moreover, when the communication apparatuses 30 and 40 each determine, on its own, the timing at which to start monitoring the traffic of the low latency frames by itself, the system control apparatus 10 does not transmit the monitoring start instruction frame and thus does not require the priority setting frame generation unit 15. The configuration of the system control apparatus 10, which is not equipped with the priority setting frame generation unit 15, is simple. In this case, the configuration of the system control apparatus 10 is similar to the configuration of the system control apparatus 20, or similar to the configuration of a related art. Thus, only the communication apparatuses 30 and 40 need to be newly configured in the train communication system 100.

Fifth Embodiment

The fourth embodiment makes the modification such that the control frames treated as the low latency frames come to be treated as the general frames in increasing order of the priority. A fifth embodiment makes a modification such that a control frame having been treated as a general frame comes to be treated as a low latency frame again. The fifth embodiment differs from the fourth embodiment in the respects as will be described below. Note that the configurations of the train communication system 100, the system control apparatuses 10 and 20, and the communication apparatuses 30 and 40 are similar to those of the fourth embodiment. However, the priority setting frame generation unit 15 of the system control apparatus 10 need not include the function of generating the first priority setting frame and the second priority setting frame.

Figure 18:
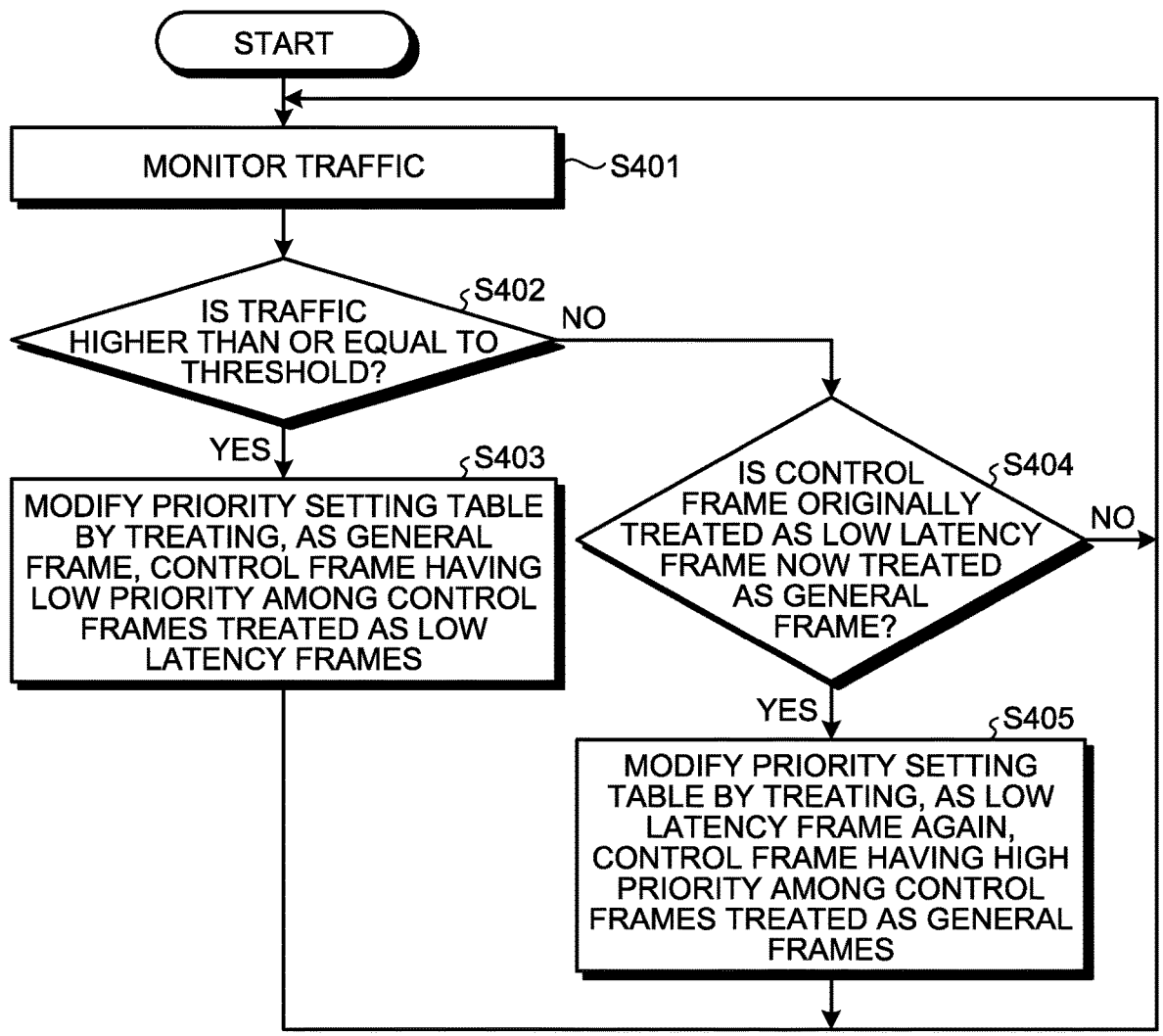
FIG. 18 is a flowchart illustrating processing in which a control frame having high priority among control frames treated as general frames is treated as a low latency frame again and transferred by the communication apparatus of the train communication system according to a fifth embodiment.

FIG. 18 is a flowchart illustrating processing in which a control frame having high priority among the control frames treated as the general frames is treated as a low latency frame again and transferred by the communication apparatuses 30 and 40 of the train communication system 100 according to the fifth embodiment. Since the communication apparatuses 30 and 40 operate in similar manners, the communication apparatus 30 will be described by way of example. The processing from step S401 to step S403 in FIG. 18 is similar to that in the flowchart of the fourth embodiment illustrated in FIG. 17.

The control unit 36 monitors the traffic of the low latency frames even after modifying the priority setting table. If the traffic of the low latency frames is less than the threshold (No in step S402), the control unit 36 checks whether a control frame, which was treated as a low latency frame, has been treated as a general frame in the processing of step S403 (step S404). If a control frame, which was treated as a low latency frame, is not treated as a general frame (No in step S404), the control unit 36 continues monitoring the traffic of the low latency frames (step S401).

If a control frame, which was treated as a low latency frame, has been treated as a general frame (Yes in step S404), the control unit 36 modifies the priority setting table of the frame identification unit 32 such that the control frames, which have been treated as the general frames, come to be treated as the low latency frames again in decreasing order of the priority (step S405).

According to the present embodiment, as described above, when the communication apparatuses 30 and 40 of the train communication system 100 treat, as the general frames, the control frames that were originally treated as the low latency frames, and the traffic of the low latency frames becomes less than the threshold, the communication apparatuses modify the content of the priority setting table such that the control frames, which were originally treated as the low latency frames but have been treated as the general frames, come to be treated as the low latency frames again in decreasing order of the priority. The communication apparatuses 30 and 40 can thus allow the control frame, which should be originally treated and transferred as the low latency frame but has been treated as the general frame, to be treated as the low latency frame again and transferred when the traffic of the low latency frames in the low latency transfer processing unit 34 is reduced. As a result, the control frame can be transferred with low latency. The communication apparatuses 30 and 40, which neither transmits the first and second notification frames nor receives the first and second priority setting frames, can reduce the processing load as compared to the second embodiment.

Since the system control apparatus 10 does not transmit the first and second priority setting frames, the system control apparatus 10 can reduce the processing load as compared to the second embodiment. Moreover, when the communication apparatuses 30 and 40 each determine, on its own, the timing at which to start monitoring the traffic of the low latency frames, the system control apparatus 10 does not transmit the monitoring start instruction frame and thus does not require the priority setting frame generation unit 15. The configuration of the system control apparatus 10, which is not equipped with the priority setting frame generation unit 15, is simple. In this case, the configuration of the system control apparatus 10 is similar to the configuration of the system control apparatus 20, or similar to the configuration of a related art. Thus, only the communication apparatuses 30 and 40 need to be newly configured in the train communication system 100.

Sixth Embodiment

In the fourth and fifth embodiments, the communication apparatuses 30 and 40 continuously monitor the low latency frames. A sixth embodiment assumes that cars of the train split or are combined together. In particular, in the sixth embodiment, the communication apparatuses 30 and 40 monitor the traffic of the low latency frames for a predetermined period after the splitting or combination. The sixth embodiment differs from the fourth and fifth embodiments in the respects as will be described below. Note that the configurations of the train communication system 100, the system control apparatuses 10 and 20, and the communication apparatuses 30 and 40 are similar to those of the fourth and fifth embodiments.

FIG. 19 is a flowchart illustrating transfer processing in which monitoring of the traffic of the low latency frames is finished after a predetermined time elapses from the start of monitoring by the communication apparatuses 30 and 40 of the train communication system 100 according to the sixth embodiment. Since the communication apparatuses 30 and 40 operate in similar manners, the communication apparatus 30 will be described by way of example. The processing from step S401 to step S405 in FIG. 19 is similar to that in the flowchart of the fifth embodiment illustrated in FIG. 18.

If the predetermined time has not elapsed since the start of monitoring (No in step S406) during the monitoring of the traffic of the low latency frames in the low latency transfer processing unit 34 (step S401), the control unit 36 proceeds to the processing of step S402. The subsequent processing is similar to that of the fifth embodiment. If the predetermined time has elapsed since the start of monitoring (Yes in step S406), the control unit 36 finishes monitoring the traffic of the low latency frames in the low latency transfer processing unit 34 (step S407), and ends the processing. The communication apparatus 30 may determine, on its own, the timing at which to finish monitoring the traffic of the low latency frames, on the basis of the number of control frames received, or by receiving the monitoring end instruction frame from the system control apparatus 10 as described above.

According to the present embodiment, as described above, the communication apparatuses 30 and 40 of the train communication system 100 finish the monitoring of the traffic of the low latency frames after the lapse of the predetermined time from the start of the monitoring in the case where the cars of the train split or are combined together. The monitoring of the traffic of the low latency frames within the predetermined time enables the communication apparatuses 30 and 40 to modify the priority setting table in correspondence to the train set, i.e., the number of cars of the train when the traffic of the low latency frames is increased or decreased depending on the number of cars of the train, and, as compared to the continuous monitoring of the traffic of the low latency frames, reduce the processing load in monitoring the traffic of the low latency frames at the time of normal operation. The communication apparatuses 30 and 40, which neither transmits the first and second notification frames nor receives the first and second priority setting frames, reduce the processing load as compared to the third embodiment.

Since the system control apparatus 10 does not transmit the first and second priority setting frames, the system control apparatus 10 can reduce the processing load as compared to the third embodiment. Moreover, when the communication apparatuses 30 and 40 each determine, on its own, the timings at which to start and finish monitoring the traffic of the low latency frames, the system control apparatus 10 does not transmit the monitoring start instruction frame or the monitoring end instruction frame and thus does not require the priority setting frame generation unit 15. The configuration of the system control apparatus 10, which is not equipped with the priority setting frame generation unit 15, is simple. In this case, the configuration of the system control apparatus 10 is similar to the configuration of the system control apparatus 20, or similar to the configuration of a related art. Thus, only the communication apparatuses 30 and 40 need to be newly configured in the train communication system 100.

The configuration illustrated in the above embodiment merely illustrates an example of the content of the present invention, and can thus be combined with another known technique or partially omitted and/or modified without departing from the scope of the present invention.

REFERENCE SIGNS LIST

10, 20 system control apparatus; 11, 21 frame processor; 12, 22 frame reception unit; 13, 23 command unit; 14, 24 control frame generation unit; 15 priority setting frame generation unit; 16, 26, 35 output control unit; 30, 40 communication apparatus; 31 switch; 32 frame identification unit; 33 general transfer processing unit; 34 low latency transfer processing unit; 36 control unit; 50 brake; 60 air conditioner; 100 train communication system.

The invention claimed is:

1. A communication apparatus mounted on a train, the communication apparatus comprising:
   a general transfer processor to store a general frame among the control frames;
   a low latency transfer processor to store a low latency frame among the control frames, the low latency frame being required to be transferred with lower latency than the general frame;
   a frame identifier to identify priority of each of the control frames received from the system control apparatus and perform control that outputs the control frame to the general transfer processor or the low latency transfer processor on the basis of a priority setting table that indicates the priority of the control frame, the priority setting table being set in the frame identifier;
   an output-controller to preferentially transfer the low latency frame stored in the low latency transfer processor over the general frame stored in the general transfer processor; and
   a controller to perform control that modifies the priority setting table of the frame identifier, wherein the controller monitors traffic of the low latency frame in the low latency transfer processor and modifies the priority setting table on the basis of the traffic and a predetermined threshold, and wherein the controller monitors the traffic of the low latency frames by counting a number of low latency frames discarded due to an overflow of a buffer.

2. The communication apparatus according to claim 1, wherein
   when the traffic is higher than or equal to a predetermined threshold, the controller transmits a first notification frame to the system control apparatus and receives a first priority setting frame from the system control apparatus, the first notification frame indicating that the traffic is higher than or equal to the predetermined threshold, the first priority setting frame being a response to the first notification frame, the controller modifying the priority setting table on the basis of the first priority setting frame such that a control frame having low priority among the control frames treated as the low latency frames is treated as the general frame.

3. The communication apparatus according to claim 2, wherein
the controller monitors the traffic even after modifying the priority setting table and, when the traffic is less than the predetermined threshold, transmits a second notification frame to the system control apparatus and receives a second priority setting frame from the system control apparatus, the second notification frame indicating that the traffic is less than the predetermined threshold, the second priority setting frame being a response to the second notification frame, the controller modifying the priority setting table on the basis of the second priority setting frame such that a control frame having high priority among the control frames treated as the general frames is treated as the low latency frame again.

4. The communication apparatus according to claim 1, wherein
the controller starts monitoring the traffic on the basis of an instruction from the system control apparatus to start monitoring the traffic.

5. The communication apparatus according to claim 4, wherein
the controller finishes monitoring the traffic on the basis of an instruction from the system control apparatus to finish monitoring the traffic.

6. The communication apparatus according to claim 1, wherein
when the traffic is higher than or equal to a predetermined threshold, the controller modifies the priority setting table such that a control frame having low priority among the control frames treated as the low latency frames is treated as the general frame.

7. The communication apparatus according to claim 6, wherein
the controller monitors the traffic even after modifying the priority setting table and, when the traffic is less than the predetermined threshold, modifies the priority setting table such that a control frame having high priority among the control frames treated as the general frames is treated as the low latency frame again.

8. The communication apparatus according to claim 6, wherein
the controller starts monitoring the traffic after the train is started, cars of the train split, or the cars of the train are combined together.

9. The communication apparatus according to claim 8, wherein
the controller finishes monitoring the traffic after a predetermined time elapses from the start of the monitoring of the traffic.

10. A system control apparatus mounted on a train, the system control apparatus comprising:
a frame receiver to receive, from the communication apparatus according to claim 1, a first notification frame indicating that traffic of a low latency frame in the communication apparatus is higher than or equal to a predetermined threshold;
a commander to instruct generation of a first priority setting frame that is a response to the first notification frame and instructs a modification to the priority setting table such that a control frame having low priority among the control frames treated as the low latency frames is treated as a general frame;
a priority setting frame generator to generate the first priority setting frame; and
an output-controller to transmit the first priority setting frame to the communication apparatus.

11. The system control apparatus according to claim 10, wherein
the frame receiver receives, from the communication apparatus, a second notification frame indicating that the traffic is less than the predetermined threshold,
the commander instructs the priority setting frame generator to generate a second priority setting frame that is a response to the second notification frame and instructs a modification to the priority setting table such that a control frame having high priority among the control frames treated as the general frames is treated as the low latency frame again,
the priority setting frame generator generates the second priority setting frame, and
the output-controller transmits the second priority setting frame to the communication apparatus.

12. The system control apparatus according to claim 10, wherein
the commander instructs the priority setting frame generator to generate a monitoring start instruction frame that instructs the communication apparatus to start monitoring the traffic after the train is started, cars of the train split, or the cars of the train are combined together, the priority setting frame generator generates the monitoring start instruction frame, and
the output-controller transmits the monitoring start instruction frame to the communication apparatus.

13. The system control apparatus according to claim 12, wherein
the commander instructs the priority setting frame generator to generate a monitoring end instruction frame that instructs the communication apparatus to finish monitoring the traffic after a predetermined time elapses from the transmission of the monitoring start instruction frame,
the priority setting frame generator generates the monitoring end instruction frame, and
the output-controller transmits the monitoring end instruction frame to the communication apparatus.

14. A train communication system comprising:
the communication apparatus according to claim 1, the communication apparatus being mounted on each car of a train; and
a system control apparatus mounted on the train, wherein the system control apparatus comprises:
a frame receiver to receive, from the communication apparatus, a first notification frame indicating that traffic of a low latency frame in the communication apparatus is higher than or equal to a predetermined threshold;
a commander to instruct generation of a first priority setting frame that is a response to the first notification frame and instructs a modification to the priority setting table such that a control frame having low priority among the control frames treated as the low latency frames is treated as a general frame;
a priority setting frame generator to generate the first priority setting frame; and
an output-controller to transmit the first priority setting frame to the communication apparatus.

15. A train communication system comprising the communication apparatus according to claim 6, the communication apparatus being mounted on each car of a train.

16. The train communication system according to claim 15, further comprising a system control apparatus to generate and transmit a monitoring start instruction frame that instructs the communication apparatus to start monitoring traffic of a low latency frame after the train is started, cars of the train split, or the cars of the train are combined together, and generate and transmit a monitoring end instruction frame that instructs the communication apparatus to finish monitoring the traffic after a predetermined time elapses from the transmission of the monitoring start instruction frame, wherein
  the communication apparatus starts monitoring the traffic on the basis of the monitoring start instruction frame and finishes monitoring the traffic on the basis of the monitoring end instruction frame.

17. A communication method of a train communication system mounted on a train and including a system control apparatus that generates control frames and a communication apparatus that transfers the control frames, wherein
  the control frames include a general frame and a low latency frame that is required to be transferred with lower latency than the general frame, and when the communication apparatus preferentially transfers the low latency frame over the general frame, the communication method comprises:
  monitoring traffic of the low latency frame and, when the traffic is higher than or equal to a predetermined threshold, transmitting, to the system control apparatus, a first notification frame indicating that the traffic is higher than or equal to the predetermined threshold, wherein the monitoring the traffic of the low latency frame is performed by counting a number of low latency frames discarded due to an overflow of a buffer;
  transmitting, to the communication apparatus, a first priority setting frame that is a response to the first notification frame, the communication apparatus having a priority setting table set therein, the priority setting table indicating priority of the control frames and instructing a modification to the priority setting table such that a control frame having low priority among the control frames treated as the low latency frames is treated as the general frame; and
  modifying the priority setting table on the basis of the first priority setting frame such that a control frame having low priority among the control frames treated as the low latency frames is treated as the general frame.

18. The communication method according to claim 17, further comprising:
  monitoring the traffic even after modifying the priority setting table and, when the traffic is less than the predetermined threshold, transmitting, to the system control apparatus, a second notification frame indicating that the traffic is less than the predetermined threshold;
  transmitting, to the communication apparatus, a second priority setting frame that is a response to the second notification frame and instructs a modification to the priority setting table such that a control frame having high priority among the control frames treated as the general frames is treated as the low latency frame again; and
  modifying the priority setting table on the basis of the second priority setting frame such that a control frame having high priority among the control frames treated as the general frames is treated as the low latency frame again.

19. A communication method of a train communication system mounted on a train and including a system control apparatus that generates control frames and a communication apparatus that transfers the control frames, wherein
  the communication apparatus has a priority setting table set therein, the priority setting table indicating priority of the control frames,
  the control frames include a general frame and a low latency frame that is required to be transferred with lower latency than the general frame, and when the communication apparatus preferentially transfers the low latency frame over the general frame, the communication method comprises:
  monitoring traffic of the low latency frame and, when the traffic is higher than or equal to a predetermined threshold, modifying the priority setting table such that a control frame having low priority among the control frames treated as the low latency frames is treated as the general frame, wherein the monitoring the traffic of the low latency frames is performed by counting a number of low latency frames discarded due to an overflow of a buffer.

20. The communication method according to claim 19, further comprising
  monitoring the traffic even after modifying the priority setting table and, when the traffic is less than the predetermined threshold, modifying the priority setting table such that a control frame having high priority among the control frames treated as the general frames is treated as the low latency frame again.

* * * * *